(12) United States Patent
Statnikov

(10) Patent No.: US 7,301,123 B2
(45) Date of Patent: Nov. 27, 2007

(54) METHOD FOR MODIFYING OR PRODUCING MATERIALS AND JOINTS WITH SPECIFIC PROPERTIES BY GENERATING AND APPLYING ADAPTIVE IMPULSES A NORMALIZING ENERGY THEREOF AND PAUSES THEREBETWEEN

(75) Inventor: Efim S. Statnikov, Birmingham, AL (US)

(73) Assignee: U.I.T., L.L.C., Birmingham, AL (US)

( * ) Notice: Subject to any disclaimer, the term of this patent is extended or adjusted under 35 U.S.C. 154(b) by 186 days.

(21) Appl. No.: 10/834,180

(22) Filed: Apr. 29, 2004

(65) Prior Publication Data
US 2005/0242066 A1    Nov. 3, 2005

(51) Int. Cl.
*B23K 9/09* (2006.01)
*C21D 10/00* (2006.01)

(52) U.S. Cl. .............. 219/130.51; 148/558
(58) Field of Classification Search .......... 219/130.51, 219/137 R, 137 PS; 148/558; 266/60
See application file for complete search history.

(56) References Cited

U.S. PATENT DOCUMENTS

| | | | |
|---|---|---|---|
| RE16,599 | E | 4/1927 | Mattice |
| 1,703,111 | A | 2/1929 | Kniatt |
| 1,770,932 | A | 7/1930 | Leake |
| 2,537,533 | A | 1/1951 | Ingalls |
| 3,210,843 | A | 10/1965 | Seul et al. |
| 3,274,033 | A | 9/1966 | Jacke |
| 3,622,404 | A | 11/1971 | Thompson |
| 3,650,016 | A | 3/1972 | McMaster |
| 3,661,655 | A | 5/1972 | Hrusovsky |
| 3,782,160 | A | 1/1974 | Kheifets et al. |
| 3,864,542 | A * | 2/1975 | Fletcher et al. ........ 219/137 PS |
| 3,945,098 | A | 3/1976 | Yascheritsyn et al. |
| 3,961,739 | A | 6/1976 | Leftheris |
| 4,049,186 | A | 9/1977 | Hanneman et al. |
| 4,126,031 | A | 11/1978 | Ignashev et al. |

(Continued)

FOREIGN PATENT DOCUMENTS

EP     0 524 156 A1    1/1993

(Continued)

OTHER PUBLICATIONS

Fisher et al., "Fatigue Strength Improvement of Bridge girders by Ultrasonic Impact Treatment (UIT)," IIW/IIS Document XIII-1916-02, Copenhagen, 2002, 15 pgs.

(Continued)

*Primary Examiner*—Clifford C. Shaw
(74) *Attorney, Agent, or Firm*—Foley & Lardner LLP

(57) ABSTRACT

A method of impulse treatment which modifies at least one specified property of a material or object (such as a welded joint), or produces a material or object with at least one specified physical, mechanical or structural property, by adaptively controlling an impulse action upon the material/object is described. An impulse action includes normalized impulses and pauses, i.e., a controlled and adaptive alternation of periods of material condition impulse activation with periods of relaxation therebetween, wherein the pauses allow the material to recover from the impulse before the next impulse is applied to the material. The energy of the impulse actions can originate from various sources, but the method of the invention is in particular advantageous when the energy of action is initiated and delivered by ultrasonic impact, wherein the energy is applied to any suitable material so that at least one property of the material is modified or produced in order to attain a desired technical effect.

61 Claims, 19 Drawing Sheets

U.S. PATENT DOCUMENTS

| | | | |
|---|---|---|---|
| 4,250,726 A | 2/1981 | Safian et al. | |
| 4,330,699 A | 5/1982 | Farrow | |
| 4,453,392 A | 6/1984 | Klubovich et al. | |
| 4,624,402 A | 11/1986 | Pitcairn et al. | |
| 4,823,599 A | 4/1989 | Schneider | |
| 4,887,662 A | 12/1989 | Tanaka et al. | |
| 4,968,359 A | 11/1990 | Hebel, Jr. et al. | |
| 5,035,142 A | 7/1991 | Dryga et al. | |
| 5,166,885 A * | 11/1992 | Thompson | 451/2 |
| 5,193,375 A | 3/1993 | Meister | |
| 5,242,512 A * | 9/1993 | Bagley et al. | 148/558 |
| 5,286,313 A | 2/1994 | Schultz et al. | |
| 5,302,218 A | 4/1994 | Shirai et al. | |
| 5,330,790 A | 7/1994 | Calkins | |
| 5,352,305 A | 10/1994 | Hester | |
| 5,525,429 A | 6/1996 | Mannava et al. | |
| 5,569,018 A | 10/1996 | Mannava et al. | |
| 5,654,992 A | 8/1997 | Uraki et al. | |
| 5,664,648 A | 9/1997 | Hester | |
| 5,674,328 A | 10/1997 | Mannava et al. | |
| 5,756,965 A | 5/1998 | Mannava | |
| 5,771,729 A | 6/1998 | Bailey et al. | |
| 5,826,453 A | 10/1998 | Prevey, III | |
| 5,841,033 A | 11/1998 | Burris et al. | |
| 5,976,314 A | 11/1999 | Sans | |
| 6,144,012 A | 11/2000 | Dulaney et al. | |
| 6,171,415 B1 | 1/2001 | Statnikov | |
| 6,223,974 B1 | 5/2001 | Unde | |
| 6,269,669 B1 | 8/2001 | Matsubara et al. | |
| 6,289,705 B1 | 9/2001 | Duquenne et al. | |
| 6,289,736 B1 | 9/2001 | Statnikov | |
| 6,338,765 B1 | 1/2002 | Statnikov | |
| 6,458,225 B1 | 10/2002 | Statnikov | |
| 6,467,321 B2 | 10/2002 | Prokopenko et al. | |
| 6,517,319 B2 | 2/2003 | Webster et al. | |
| 6,722,175 B2 | 4/2004 | Statnikov | |
| 6,843,957 B2 | 1/2005 | Statnikov | |
| 6,932,876 B1 | 8/2005 | Statnikov | |
| 7,032,725 B2 | 4/2006 | Statnikov | |
| 2002/0014100 A1 | 2/2002 | Prokopenko et al. | |
| 2002/0037219 A1 | 3/2002 | Webster et al. | |
| 2002/0043313 A1 | 4/2002 | Statnikov | |
| 2004/0173290 A1 | 9/2004 | Statnikov | |
| 2004/0244882 A1 * | 12/2004 | Lobanov et al. | 148/558 |
| 2005/0092397 A1 | 5/2005 | Statnikov | |
| 2005/0145306 A1 | 7/2005 | Statnikov | |
| 2006/0016858 A1 | 1/2006 | Statnikov et al. | |
| 2006/0057836 A1 | 3/2006 | Nagarajan et al. | |

FOREIGN PATENT DOCUMENTS

| | | |
|---|---|---|
| FR | 2 662 180 A1 | 11/1991 |
| JP | 55-4435 A | 1/1980 |
| JP | 09-001666 A | 1/1997 |
| JP | 2004-122144 A | 4/2004 |
| JP | 2004-122152 A | 4/2004 |
| JP | 2004-149843 A | 5/2004 |
| JP | 2004-167519 A | 6/2004 |
| JP | 2004-169340 A | 6/2004 |
| RU | 2 037 387 C1 | 6/1995 |
| RU | 2 068 741 C1 | 11/1996 |
| RU | 2 106 480 C1 | 3/1998 |
| SU | 563 193 A | 8/1977 |
| SU | 931236 B | 6/1982 |
| SU | 946 841 B | 8/1982 |
| SU | 983 469 A | 12/1982 |
| SU | 1 039 582 A | 9/1983 |
| SU | 1 206 032 A | 1/1986 |
| SU | 1 235 932 A | 6/1986 |
| SU | 1 413 598 A | 7/1988 |
| SU | 1 420 035 A | 8/1988 |
| SU | 1 735 400 A1 | 5/1992 |
| SU | 1 752 448 A1 | 8/1992 |
| SU | 1 772 646 A1 | 10/1992 |
| SU | 1794637 A1 | 2/1993 |
| WO | WO 91/17273 A1 | 11/1991 |
| WO | WO 93/20247 A1 | 10/1993 |
| WO | WO 94/01962 A1 | 1/1994 |
| WO | WO 98/43748 A1 | 10/1998 |
| WO | WO 98/43749 A1 | 10/1998 |
| WO | WO 02/101097 | 12/2002 |
| WO | WO 02/101097 A1 * | 12/2002 |
| WO | WO 2004/013359 A1 | 2/2004 |
| WO | WO 2006/057836 A2 | 6/2006 |

OTHER PUBLICATIONS

Fisher et al., "Fatigue strength enhancement by means of weld design change and the application of ultrasonic impact treatment," 14 pgs.

Galtier et al., "The influence of ultrasonic impact treatment on fatigue behaviour of welded joints in high-strength steel," IIW/IIS Document XIII-1976-03, Bucharest, 2003, 12 pgs.

Guenther et al., "Rehabilitation of Welded Joints by Ultrasonic Impact Treatment (UIT)," IABSE Symposium, Lisbon, 2005, 7 pgs.

Haagensen et al., "Introductory fatigue tests on welded joints in high strength steel and aluminium improved by various methods including ultrasonic impact treatment (UIT)," IIW Doc. XIII-1748-98, Hamburg, 1998, 12 pgs.

Janosch et al., "Improvement of fatigue strength in welded joint (in HSS and aluminium alloy) by ultrasonic hammer peening," IIW Doc. XIII-1594-95, Stockholm, 1995, 21 pgs.

Kudryavtsev et al., "Increasing the fatigue strength of welded joints in cyclic compression," IIW Doc. XIII-1569-94, Beijing, 1994, 6 pgs.

Lihavainen et al., "Fatigue strength of a longitudinal attachment improved by ultrasonic impact treatment," IIW Doc. XIII-1990-03, Bucharest, 2003, 12 pgs.

Roy et al., "Improving Fatigue Strength of Welded Joints by Ultrasonic Impact Treatment," (http://www.appliedultrasonics.com/Research.htm), 6 pgs.

Roy et al., "Enhancing Fatigue Strength by Ultrasonic Impact Treatment," (http://www.appliedultrasonics.com/Research.htm), 35 pgs.

Statnikov et al., "Efficiency Evaluation of Ultrasonic Impact Treatment (UIT) of Welded Joints in Weldox 420 Steel in accordance with the IIW Program," (http://www.appliedultrasonics.com/Research.htm), 30 pgs.

Statnikov et al., "Repair Case Study," IIW Doc XIII-WG5-18-98, Hamburg, 1998, 8 pgs.

Statnikov, E.S., "Guide for application of ultrasonic impact treatment for improving fatigue life of welded structures," IIW/IIS—Doc. XIII-1757-99, Lisbon, 1999, 19 pgs.

Statnikov et al., "Comparison of Ultrasonic Impact Treatment (UIT) and other Fatigue Life Improvement Methods," IIW/IIS—Document XIII-1817-00, Florence, 2000, 27, pgs.

Statnikov, E.S., "Repair of Fatigue Loaded Weld Structures," IIW Doc. No. XIII-WG-1873-01, Slovenia, 2001, 6 pgs.

Statnikov et al., "Comparison and the Improvement in corrosion Fatigue Strength of Weld Repaired Marine Cu 3-grade Bronze Propellers by Ultrasonic Impact Treatment (UIT) or Heat Treatment," IIW/IIS—Doc. XIII-1964-03, Bucharest 2003, 34 pgs.

Statnikov et al., "Specification for weld toe improvement by ultrasonic impact treatment," IIW Doc. XIII-1617-96, Budapest, 1996, 10 pgs.

Statnikov et al., "Ultrasonic impact treatment (UIT) of welded joints (Summary of the method)," Budapest, 1996, 3 pgs.

Statnikov, E.Sh., "Applications of operational ultrasonic impact treatment (UIT) technologies in production of welded joints," IIW/IIS—Doc XIII-1667-97, 17 pgs.

Statnikov, E.Sh., "Comparison of post-weld deformation methods for increase in fatigue strength of welded joints," IIW/IIS—Doc. XIII-1668-97, San Francisco, 1997, 7 pgs.

Statnikov, E.S., "Guide for application of ultrasonic impact treatment improving fatigue life of welded structures," IIW/IIS—Doc. XIII-1757-99, Lisbon, 1999, 17 pgs.

Statnikov, E., "Physics and mechanism of ultrasonic impact treatment," IIW Doc. XIII-2004-04, 30 pgs.

Trufyakov et al., "Ultrasonic Impact Treatment of Welded Joints," IIW Doc. XIII-1609-95, 10 pgs.

Trufiakov et al., "The Efficiency of Ultrasonic Impact Treatment for Improving the Fatigue Strength of Welded Joints," IIW Doc. XIII-1745-98, Hamburg, 1998, 12 pgs.

Wright, W., "Post-weld treatment of a welded bridge girder by ultrasonic impact treatment," Sep. 29, 1996, 6 pgs.

* cited by examiner

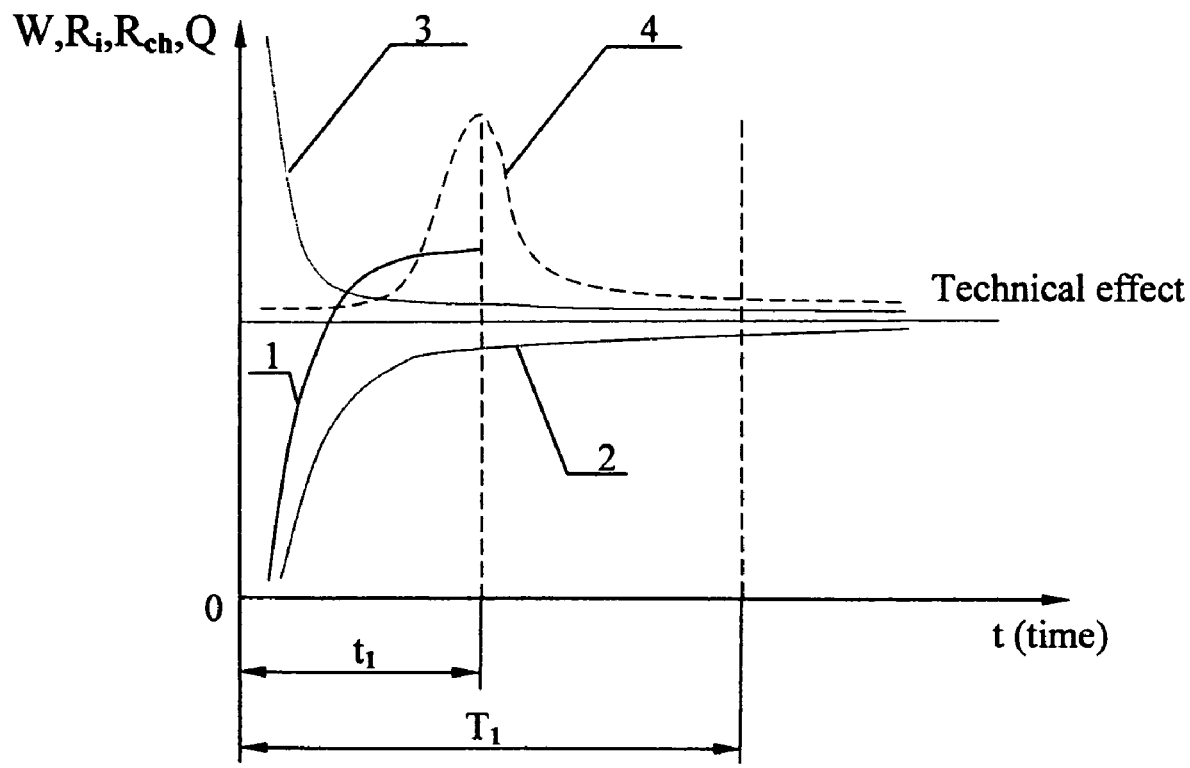

1 - Energy signal power, W;
2 - Resulting material quality, Q;
3 - impact action resistance, $R_i$;
4 - characteristic resistance of the material structure to the action, $R_{ch}$;
$t_1$ - characteristic time for material resistance to attain specified technical effect;
$T_1$ - characteristic period of a single impulse action to attain specified technical effect;
$(T_1 - t_1)$ - characteristic time to relax action resistance.

FIGURE 2

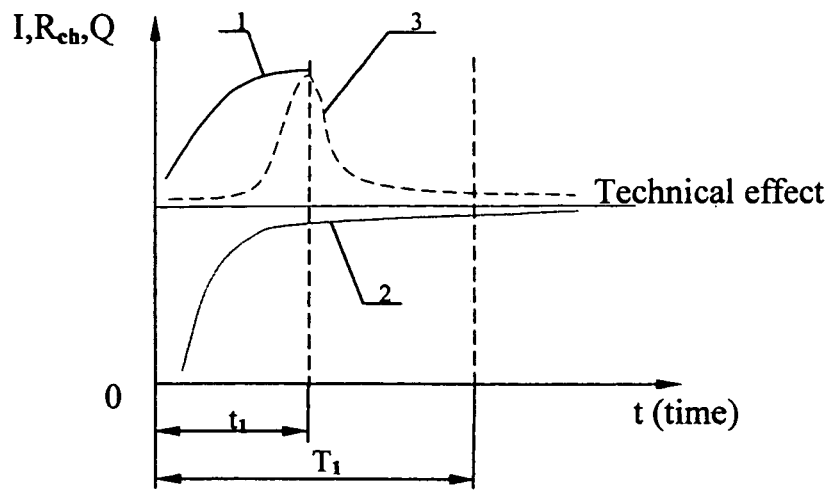

1 – current strength, I;
2 – resulting material quality, Q;
3 – characteristic resistance of the material structure to the action, $R_{ch}$;
$t_1$ - characteristic time for material resistance to attain specified technical effect;
$T_1$- characteristic period of a single impulse action to attain specified technical effect;
$(T_1 - t_1)$- characteristic time to relax action resistance.

FIGURE 4

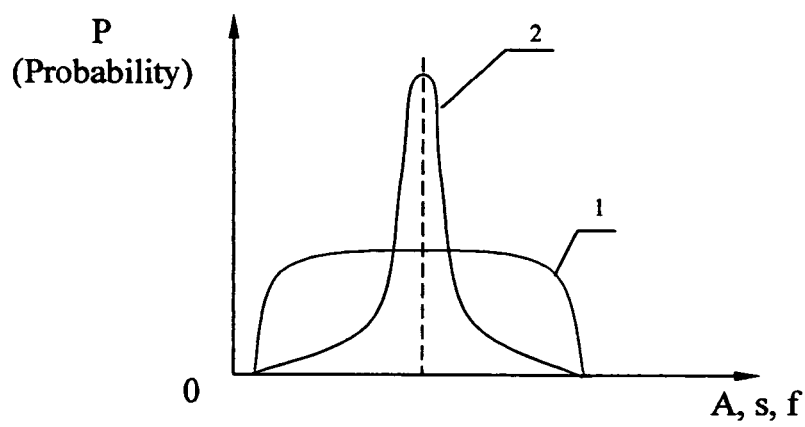

1 – random parameter range;
2 – controlled parameter range;
A – amplitude;
s – off-duty factor;
f – frequency.

FIGURE 5

$$k_i = \frac{r_i}{n_i}$$

where   $k_i$ – probabilistic control coefficient;
        $r_i$ – number of parameter recurrence;
        $n_i$ – number of impacts;
        $i$ – number of events.

1 – adaptive process;
2 – actual process;
3 – actual process parameter adaptation;
4 – reference process.

$R_{Ch.}$ - characteristic resistance of the structure to the action
$\sigma_I$ - stresses of the 1st kind
$\sigma_{II}$ - stresses of the 2nd kind
M - mesostructure Ultrasonic impact Example
At f=27 kHz t=37μs σ – Stresses in impact area
Q – Resulting Material Quality FIGURE 12(a)   Example

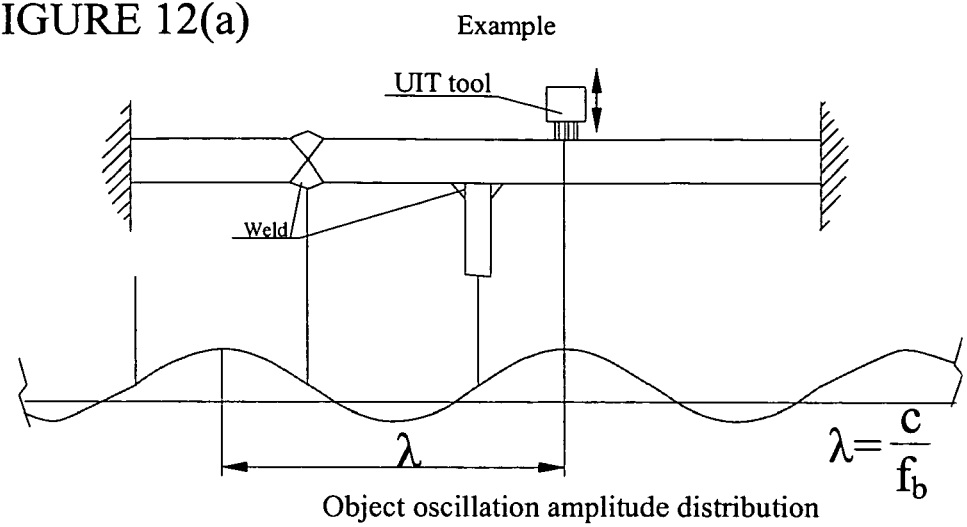

Object oscillation amplitude distribution $$\lambda = \frac{c}{f_b}$$

FIGURE 12(b)

Treated object spectrum

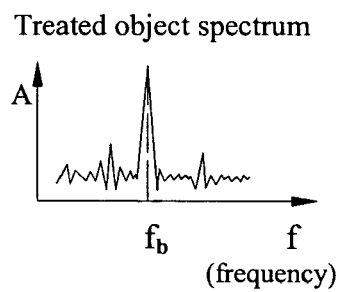

FIGURE 12(c)

Object excitation

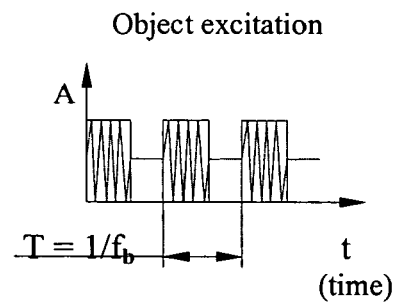

$T = 1/f_b$

Object condition relaxation

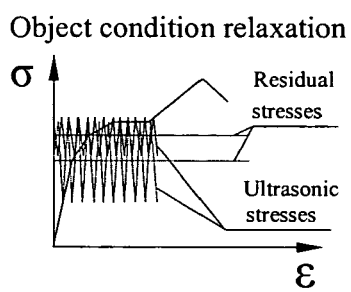

Relationship between the necessary ultrasonic stress amplitude and residual stress level during relaxation

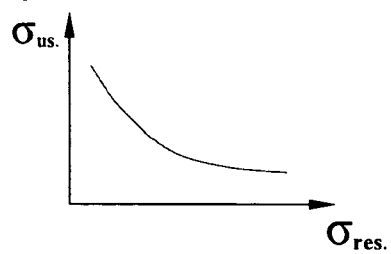

FIGURE 12(d)   FIGURE 12(e)

$\lambda$ - sound wave length;
c - sound speed;
A – oscillating system amplitude;
$\sigma$ - stresses;
$\sigma_{us.}$ - ultrasonic stresses;
$\sigma_{res.}$ - residual stresses;
$\varepsilon$ - relative strain;
$f_b$ - oscillation frequency of structure

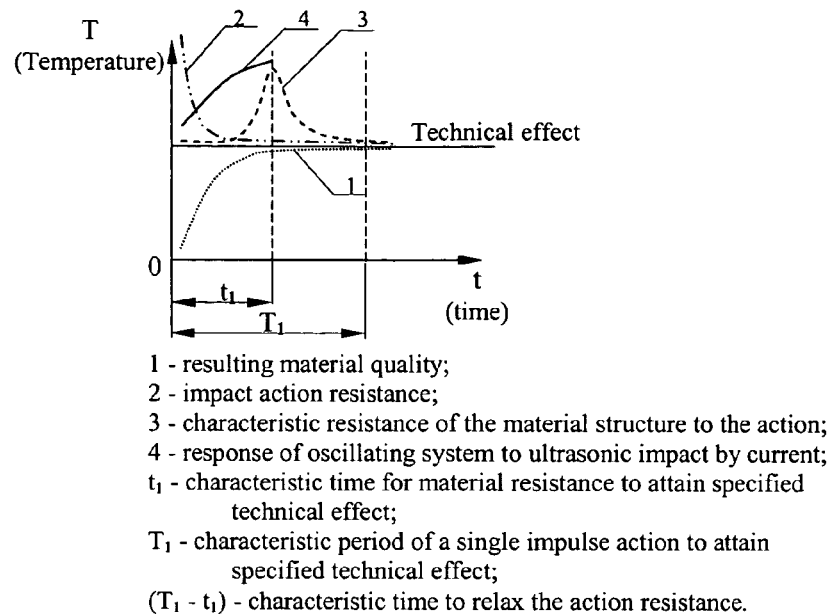

1 - resulting material quality;
2 - impact action resistance;
3 - characteristic resistance of the material structure to the action;
4 - response of oscillating system to ultrasonic impact by current;
$t_1$ - characteristic time for material resistance to attain specified technical effect;
$T_1$ - characteristic period of a single impulse action to attain specified technical effect;
$(T_1 - t_1)$ - characteristic time to relax the action resistance.

FIGURE 14(a)

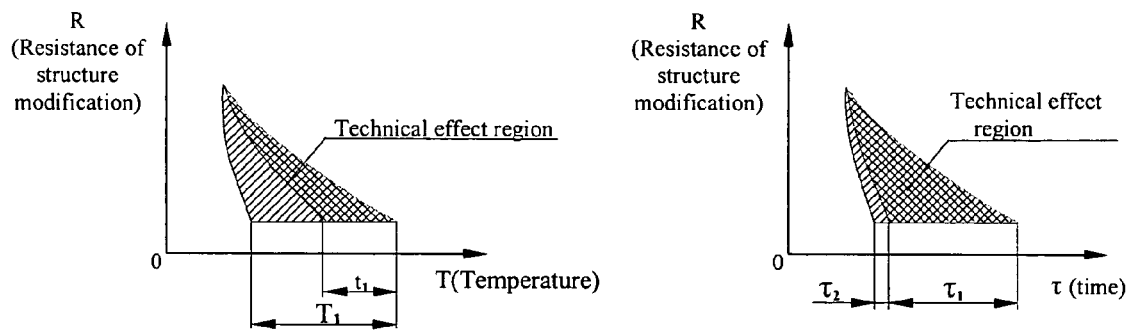

$T_1 \gg t_1$
$t_1$ - temperature range without ultrasonic effect;
$T_1$ - temperature range in the ultrasonic impact region.

FIGURE 14(b)

$\tau_2 \ll \tau_1$
$\tau_1$ - heat treatment standard time without ultrasonic vibrations;
$\tau_2$ - heat treatment time with ultrasonic vibrations.

FIGURE 14(c)

Before treatment    After treatment

Increase of afterflow velocity / creep rate under the effect of ultrasound

Changing velocity of mobile dislocations under the effect of ultrasound

1 - without ultrasound;
2 - with ultrasound.

V - average velocity of mobile dislocations
ε – relative deformation

1 - without ultrasound;
2 - with ultrasound.

1 - without ultrasound;
2 - with ultrasound.

1 - without ultrasound;
2 - with ultrasound.

- $t_1$ - ultrasonic impact length
- $t_2$ - length of pause between ultrasonic impacts
- $f_{im.}$ - impact frequency
- $f_b$ - ultrasonic oscillation frequency
- V - workpiece speed
- $S_{ind.}$ - indentation area
- $V_{ind.}$ - indentation volume
- E - treatment effectiveness
- D - impact density
- W - impact energy FIGURE 30(a)

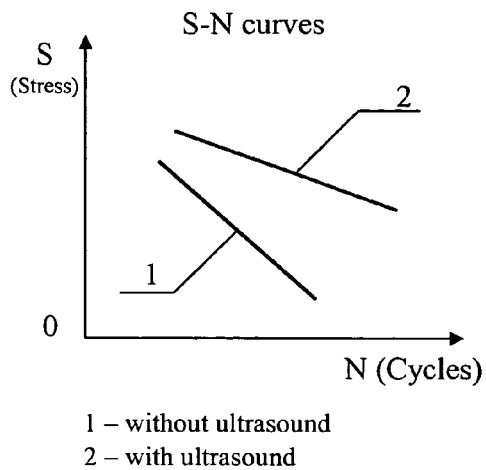

S-N curves

1 – without ultrasound
2 – with ultrasound

Stress concentration factor as a function of the UIT groove radius

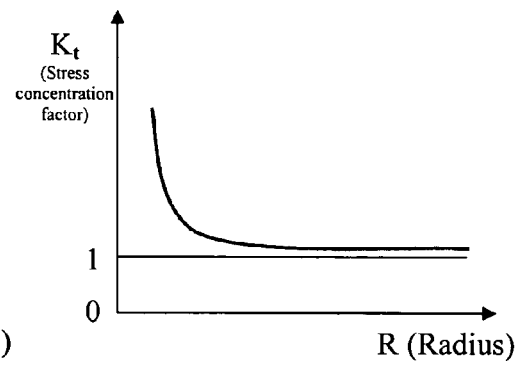

FIGURE 30(b)

Ultimate Stress Diagram

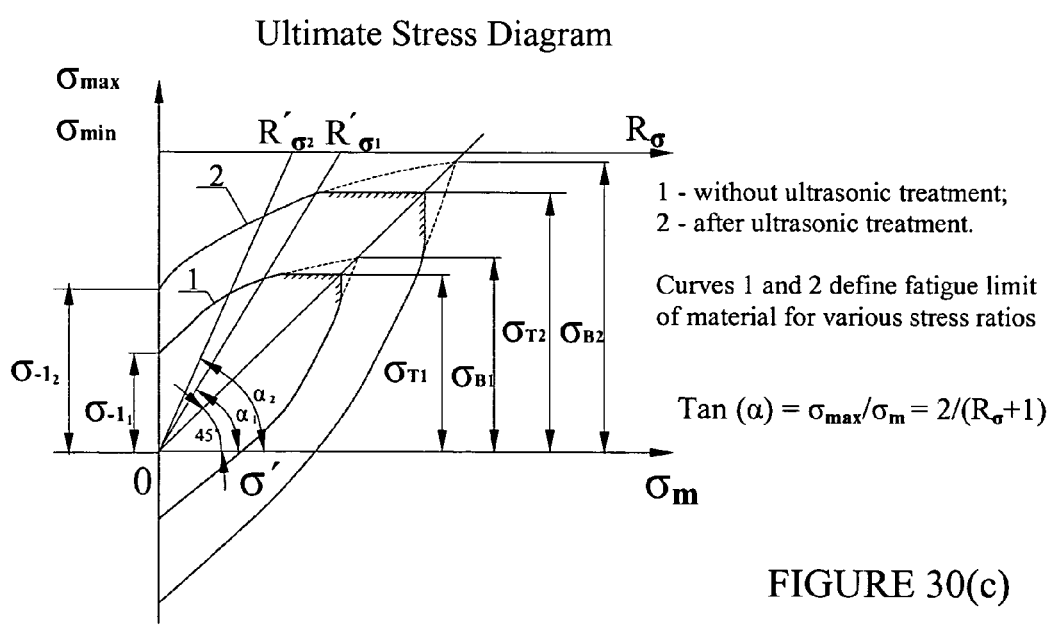

1 - without ultrasonic treatment;
2 - after ultrasonic treatment.

Curves 1 and 2 define fatigue limit of material for various stress ratios $\operatorname{Tan}(\alpha) = \sigma_{max}/\sigma_m = 2/(R_\sigma+1)$ FIGURE 30(c)

$\sigma_m$ - mean stress;

$\sigma_{max}$ - maximum stress;

$\sigma_{min}$ - minimum stress;

$\sigma_{T1}$ - yield point of untreated material;

$\sigma_{T2}$ - yield point of ultrasonically treated material;

$\sigma_{B1}$ - ultimate resistance of untreated material;

$\sigma_{B2}$ - ultimate resistance of ultrasonically treated material;

$\sigma_{-1_1}$ - endurance limit at symmetric loading cycle (untreated condition);

$\sigma_{-1_2}$ - endurance limit at symmetric loading cycle after ultrasonic treatment.

$R_\sigma$ - stress ratio;

$R'_{\sigma 1}$ - stress ratio corresponding to $\sigma'$ of ultrasonically treated material;

$R'_{\sigma 2}$ - stress ration corresponding to $\sigma'$ of untreated material.

METHOD FOR MODIFYING OR PRODUCING MATERIALS AND JOINTS WITH SPECIFIC PROPERTIES BY GENERATING AND APPLYING ADAPTIVE IMPULSES A NORMALIZING ENERGY THEREOF AND PAUSES THEREBETWEEN

FIELD OF INVENTION

The present invention relates to a method of impulse treatment which modifies or produces at least one specified property of a material or object such as a welded joint, or produces a material or object with at least one specified property, by adaptively controlling an impulse action upon the material/object. An impulse action comprises normalized impulses and pauses, i.e., a controlled and adaptive alternation of periods of material condition impulse activation with periods of relaxation/pauses therebetween. The energy of the impulses and equivalent impact actions can originate from various sources, but the method of the invention is in particular advantageous when the energy is initiated and delivered by ultrasonic impact, wherein the energy is applied to any suitable material or object, e.g., a joint, so that at least one property of the material or object is modified or produced in the area treated by the series of controlled impulse actions in order to attain a desired technical effect.

BACKGROUND OF INVENTION

The modification of one or more properties, which necessarily results in modification of one or more conditions and/or structures, of materials and joints to provide materials and joints with specified physical, mechanical and structural properties, and the manufacture thereof, has generally been achieved by the application of continuous action, such as a form of energy, upon the material or by the stochastic transformation of this action upon the material. As such, various technologies have been developed to change or modify properties of materials and joints, and also to provide ways of manufacturing materials and joints which have specific properties. Many of these different technologies have developed in the area of generating technical effects that differ in results and goals, but are virtually united, irrespective of the technique, by a single unified concept of achieving specified properties and characteristics in the materials and joints. This concept has been based on the stringent process variations of the technology which are based, regardless of the methods of controlling operational procedure parameters of each process, on the direct non-adapted action upon the material so as to achieve the desired technical effect.

By convention, these technologies may be divided into two main groups: (1) volumetric and (2) localized. Volumetric technologies are those technologies accompanied by a simultaneous effect upon the entire product, material or joint, as for example in furnace heat treatment, bath galvanization, heat melting, and other processes. Localized technologies are those technologies accompanied by a local effect, i.e., an effect upon a specified area, on the product, material or joint, as for example in welding, ultrasonic impact treatment and other processes.

These technologies of the prior art are implemented based upon "stringent" algorithms that do not take into account the material's response to the effect of the action, i.e., the energy or technology. In some of these technologies, the process parameter deviation is monitored and the parameters are corrected so as to comply with a value previously specified. As such, the in-process control is not to control the change in the property, condition or structure of the material during the action, but to formally and stringently maintain the process conditions associated with these technologies.

For example, furnace heat treatment is an example of volumetric technology. During furnace heat treatment, a material is slowly heated, held at a phase transformation temperature and then slowly cooled. Long heat treatment runs stem from the need of a uniform distribution of heat within the furnace and within the material volume throughout the process. However, under actual conditions there are prerequisites for temperature gradients that, in turn, necessitate the material overheating to compensate for the unfavorable consequences of heat removal from the surface and near-surface volumes of the material. Thus, this typical volumetric process may be accompanied by excessive energy consumption, non-uniform heating and the formation of the attendant field of unfavorable residual stresses and deformations that are most often of tensile nature.

An example of a "stringent" localized technology is ultrasonic surface peening (termed "UP"). With this technology, a desired technical effect is obtained by surface plastic deformation under conditions of random single impacts that occur due to slight coupling between an ultrasonic transducer and an indenter under load. The stochastic nature of the random impacts during ultrasonic surface peening results in non-uniform surface treatment, the condition of which is controlled visually or using reference specimens until the material surface is completely covered with treatment marks. To accomplish this, the operator may use additional passes with a tool which can create conditions for excessive surface deformation and possible over-hardening. Thus, this localized technology process is accompanied by the problems of damaging the material mesostructure, providing non-uniform treatment at the level of limiting characteristics of various materials and a limited area of application that is restricted by the initial strength of the material, such as the initial strength of metal and alloy materials.

A common problem of "stringent" technologies defined in essence by the process algorithm is a possible disturbance of the specified relation between the effect upon the material, i.e., its parameters, and the expected effect, i.e., output characteristics of the material. This results in unjustified energy consumption, possible structural failures, non-uniform distribution of the treatment effects over the surface and within the volume of the material being treated, a great scatter of results and a possible deterioration of technology quality and reliability.

Other prior art technologies include, but are not limited to, pressure diffusion, diffusion welding, friction welding, ultrasonic welding, temperature diffusion, ultrasonic diffusion and impact diffusion. Pressure diffusion is a diffusion process caused by static loading sufficient for creating necessary plastic deformations in the materials being joined. Diffusion welding is pressure welding effected by the inter-diffusion of atoms of the contacting materials with relatively long exposure to elevated temperatures and moderate plastic deformation. Friction welding is a process in which a weld area of a material is heated to a plastic state through the heat released in the friction of the interfaces of the material. Ultrasonic welding is pressure welding under ultrasonic oscillations, wherein the weld is made by a combined action of high-frequency mechanical oscillations, accompanied by the material heating in the weld area, and a compressive pressure applied perpendicular to the surfaces of the materials being joined. Temperature diffusion is a diffusion process caused by the exposure to elevated temperatures. Ultrasonic diffusion is a diffusion process caused by ultrasonic oscillations, specifically in applying coatings. Impact diffusion is a diffusion process caused by impact action.

Also known in the prior art are the basic mechanisms of fundamental metal structure transformation phenomena. These include, but are not limited to, plastic deformation, formation of the mesostructure, diffusion in metals and alloys, residual stress relaxation and corrosion. Plastic deformation is the residual change in the shape or dimensions of the loaded body of the material without discontinuity introduction. Formation of the mesostructure is where the metal structure material is at the level of comparatively coarse formations resistant to external actions with sizes between ~$10^{-3}$ and ~10 μm. Diffusion in metals and alloys is the elementary process of displacement of atoms of crystalline material for distances greater than a lattice spacing. Residual stress relaxation is the gradual stress decrease with a constant total deformation, i.e., elastic and plastic deformation, of a material. Corrosion is a deterioration of a metallic surface under chemical or electrochemical environmental attack.

Also known in the prior art is the effect of ultrasonic treatment on the metal structure transformation mechanisms. Many properties are associated with the ultrasonic impact treatment technique. Some of these properties include improving the process of metal plastic deformation to a greater or lesser extent depending on the selected treatment variation; inducing considerable compressive stresses into the surface layer of a treated material, thereby improving the fatigue strength of the material; aiding in various processes of sizing and hardening treatments of materials; forming a honeycomb mesostructure in the surface layer of a treated material, thereby improving its strength properties; accelerating diffusion processes in metals; relaxing residual stresses in metal structures; and improving the corrosion resistance of the treated surfaces of the material. All of these properties associated with ultrasonic impact treatment of materials increase the quality and reliability of the treated material, thereby increasing the quality and reliability of structures and machinery components.

The energy consumed in these prior art processes is spent not only to overcome natural energy thresholds governed by the material structure features and structural behavior on obtaining specified technical characteristics, but also to overcome uncontrolled (excess) increase in resistance during the uncontrolled action not associated with the material's response to the action and to overcome material condition fluctuations caused by the action upon the material. Thus, when using a "stringent" algorithm, the total energy consumption is more than two times greater than that for overcoming natural energy thresholds of the material structural state upon attaining specified technical effects.

The prior art methods, including the prior art method of ultrasonic impact treatment, are restricted to surface treatment, a stochastic initiation mechanism of random impacts, a non-uniform distribution of the treatment results, limited control of impact parameters, a complex optimization of the impact and a complex adaptation of treatment conditions to the effects on the surface of the material.

As such, the present invention addresses the disadvantages of the prior art technologies, thereby providing a method of adaptive impulse treatment which attains the desired technical effect with minimum energy consumption, optimally distributes the energy in a material and in time, uniformly distributes the specified treatment results in a given volume of the material and the surface thereof. The present invention also addresses the disadvantages of the prior art technologies by providing a method of impulse treatment having controlled impact impulses and adaptation of impulse parameters to the desired technical effect by directly taking into account the response of the material to the action.

OBJECTS AND SUMMARY OF INVENTION

The present invention relates to a method of impulse treatment which modifies at least one specified property of a material or object (such as a welded joint), or modifies or produces a material or object with at least one specified physical, mechanical or structural property, by initiating and adaptively controlling an impulse action upon the material/object. The impulse action comprises normalized impulses and pauses, i.e., a controlled and adaptive alternation of periods of material condition impulse activation with periods of relaxation/pause therebetween. In a preferred embodiment of the present invention, the impulse action is a carrier energy signal of a source of energy. The source of energy of the adaptively controlled impulse action used in the method of impulse treatment is a series of controlled ultrasonic impact treatment impulse actions which may be applied to any suitable material or object, most advantageously a welded joint, so that at least one specified property of the material or object is modified or produced in the area treated by the series of controlled impulse actions in order to attain a desired technical effect. While ultrasonic impact treatment is one of the preferred types of energy of the impulse actions utilized in accordance with the method of impulse treatment of the present invention, any source of energy and any suitable material/object may be used in accordance with the method of the present invention. Further, it is to be understood that in referring herein to modifying or producing at least one property in a material or object such also refers to modifying or producing a specified condition or structure with respect to such material or object. Modification or production of a property necessarily affects other aspects of the material or object.

The method of impulse treatment of the present invention may be used in modifying or manufacturing various materials in order to attain a desired technical effect, i.e., at least one predetermined property, in the material. While the present invention may be described hereafter in terms of changing or modifying a specified property of a material, the method of the present invention also applies equally and in the same manner to manufacturing a material with a specified property, unless stated otherwise.

The method of impulse treatment of the present invention comprises applying a series of adaptively controlled impulses of energy to a targeted area of a material in the form of impulse actions. The impulse action comprises normalized impulses and pauses, i.e., a controlled and adaptive alternation of periods of material condition impulse activation with periods of relaxation/pause therebetween. The impulses are controlled, i.e., normalized, by adjusting their amplitude and length, along with the frequency of the impulses. As such, each impulse is controlled such that a regular pulse provides a regular impact to the material so that a series of controlled impulses changes at least one specified property of the material to attain a desired technical effect with minimum resistance by the material throughout the impulse treatment. The impulses and pauses are in synchronism with the response in the material to the impulse action with minimum resistance determined by the material quality saturation in the treated area.

Each impulse is a small application of energy as compared to prior art applications. Each impulse, such as a material condition impulse activation, is applied until the treated area of the material reaches a resistance point. The resistance incurred due to the intermittent impulses, i.e., material condition impulse activation, is minimal, thereby resulting in a "soft" change in the material. When a certain minimum resistance occurs in the treated area of the material, the impulse, i.e., material condition impulse activation, of the impulse action is removed and a period of relaxation/pause follows. Each period of relaxation/pause allows the material to recover from the previous impulse, i.e., material condition impulse activation, of the impulse action before the next impulse, i.e., material condition impulse activation, of the next impulse action is applied so that the material is in an optimum condition to receive the next impulse, i.e., material condition impulse activation, of the next impulse action. Since the changes in the material from each impulse are small, dissipation of resistance to a non-resistant state of the material is obtained in a short time. Thus, coordination of the impulses and pauses is provided to achieve the desired change or modification in the treated material with minimal resistance by the material. A high frequency of impulses is possible because the required period of relaxation/pause after each impulse is minimal since the resistance of the material to the impulse, i.e., material condition impulse activation, is minimized due to the small amounts of energy applied during each impulse, i.e., period of material condition impulse activation.

The method of impulse treatment of the present invention is not limited to a particular source of energy or a particular technology. As such, the present invention may be used with any source of energy and any suitable technology. For example, the sources of energy which may be used with the method of the present invention include, but are not limited to, a certain sequence of heat, electromagnetic, beam, coherent, quasi-static, acoustic, thermo-dynamic, ultrasonic and other possible effects and technologies which may be used with the method of the present invention include, but are not limited to, heat and metallurgical processes, mechanical effects, direct use of electric current, any oscillation mode in a various range of shapes and frequencies, impulse effects, acoustic waves and beam energy. Additionally, the method of the present invention may be used to treat any suitable material, such as, but not limited to, metals, alloys, plastics, amorphous, ceramic and powder materials, clad materials and composites, non-detachable joints of similar and dissimilar materials, soldered, welded and diffusion joints.

A primary object of the present invention is to provide a method of impulse treatment having a mechanism of controlled impact impulses, a uniform distribution of treatment results, controlled impact parameters, an optimization of the impact impulses on a treated material and an adaptation of treatment conditions in providing subsequent impulses based upon the effects on the material from a previous impulse in order to attain a desired technical effect on the treated material.

Another primary object of the present invention is to provide a method of impulse treatment having a high frequency of impulses since the period of relaxation/pause therebetween is minimal because the resistance by the material to the impulse, i.e., material condition impulse activation, is minimized since a small amount of adaptively controlled energy is applied during each impulse, i.e., period of material condition impulse activation.

Another object of the present invention is to provide a method of impulse treatment wherein the frequency, amplitude and length of each impulse is controlled such that a regular pulse provides a regular impact to a material so that a series of adaptively controlled impulses changes or modifies at least one specified property of the material in order to attain a desired technical effect with minimum resistance by the material throughout the impulse treatment.

Another object of the present invention is to provide a method of impulse treatment wherein the parameter controls are modified based upon the material's response to the impulse, i.e., material condition impulse activation, of each impulse action so that the material is in an optimum condition to receive the impulse, i.e., material condition impulse activation, of the next impulse action.

Another object of the present invention is to provide a method of impulse treatment wherein the changes or modifications in the material from each impulse are small so that dissipation of the resistance of the material to a non-resistant state of the material is attained in a short time, thereby lessening the time required to attain the desired technical effect in the treated area of the material.

Another object of the present invention is to provide a method of impulse treatment which is a more efficient method of modifying at least one specific property, condition and/or structure of a material or welded joint, or producing a material or joint with at least one specified physical, mechanical or structural property, which requires less time, less energy and less expense than the prior art technologies.

BRIEF DESCRIPTION OF THE DRAWINGS

Referring to the figures:

FIG. 2 is a schematic representation of the treatment method implementation of the present invention based on minimum resistance criterion;

FIG. 4 is a schematic representation of the material response measurement from the current of the energy carrier signal in accordance with the present invention;

FIG. 5 is a schematic representation of the control of impulse energy, impulse length and pauses over the entire parameter range in accordance with the present invention;

FIGS. 12(a)-12(e) are schematic representations of volumetric ultrasonic treatment in accordance with the present invention;

FIGS. 14(a)-14(c) are schematic diagrams of heat treatment control and activation in accordance with the present invention;

FIGS. 30(a)-30(d) are schematic representations of ultimate stress and fatigue behavior improvement due to ultrasonic impact treatment in accordance with the present invention.

DETAILED DESCRIPTION OF THE PREFERRED EMBODIMENTS

Figure 1:
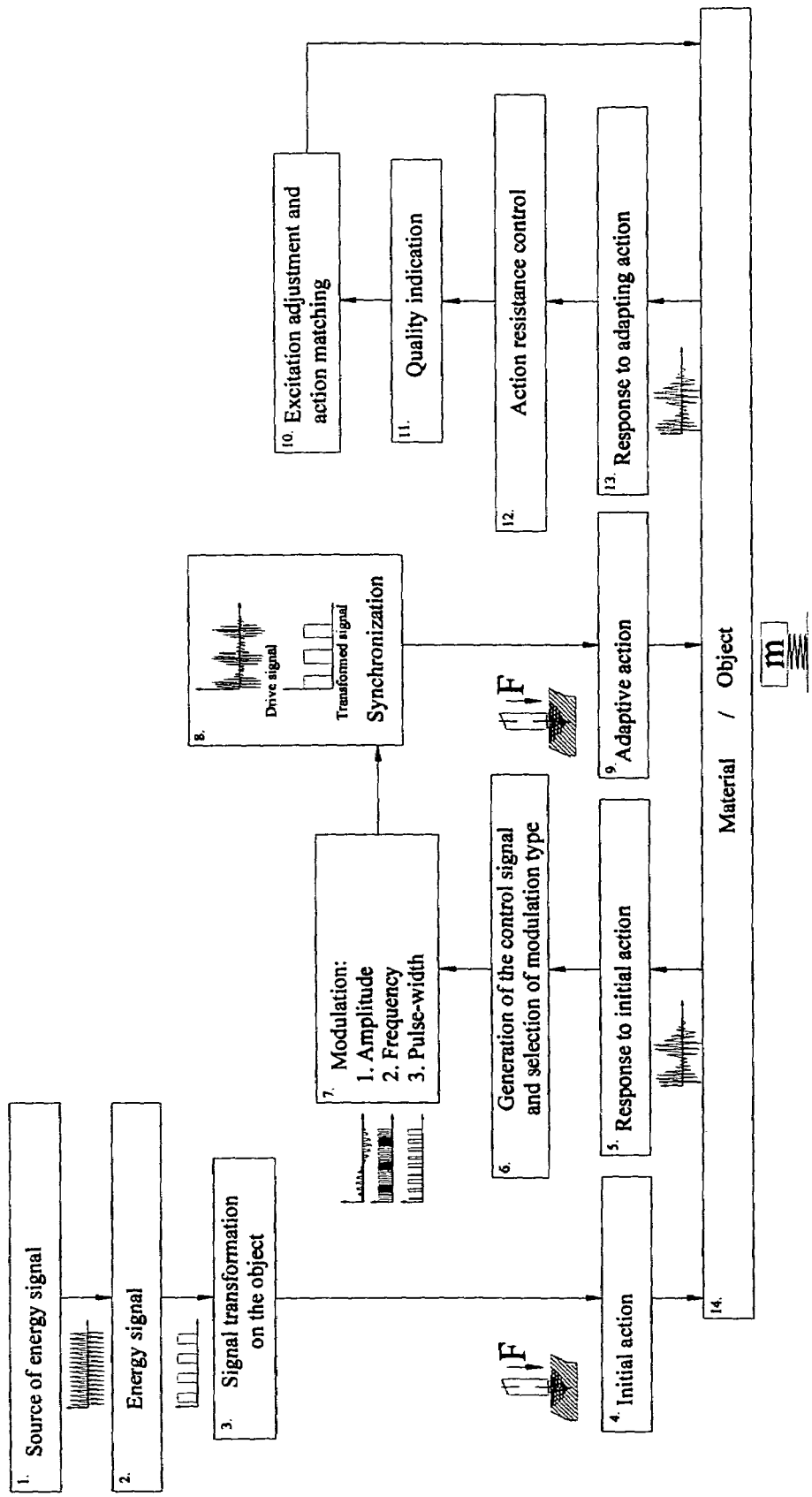
FIG. 1 is a block diagram of the method of modifying specified properties and conditions of materials and objects such as joints or producing specified properties in materials and objects of the present invention.

The present invention is a method of impulse treatment which modifies at least one specified property, condition and/or structure of a material or object, such as a welded joint, or produces a material or object with at least one specified physical, mechanical or structural property, by initiating and adaptively controlling an impulse action upon the material or object. For ease of description, treatment of a "material" will be referred to, however, such description in the specification and claims is to be understood to also encompass treatment of an object, such as a welded joint. The method of the present invention is based upon the characteristics of the treated material and the material's response to the effect of the impulse treatment during the operational procedure in real time. This method also accounts for the direct connection between the operating conditions of the controlling process device and the output characteristics of the material being treated. As such, the physical nature and the mechanism of the method provides for a functional relation with suitable parameters for the material's physical state during the operational procedure.

Throughout the description, two types of material resistance to the impulse action are: (1) the material resistance to the impulse, for example, impulse of force, which during impact is expressed via the rebound parameter and (2) the material resistance to the change in condition of the material during the impulse action, which during impact is expressed via the internal friction parameters at the structural level. The material resistance to the impulse, for example, impulse of force, is reduced, while the Q-factor of the process system increases with accumulation, such as of plastic deformation during the action, such as an impact action. The material resistance to the change in condition of the material during the action of the impulse, for example, impulse of force, increases, while the increase of the process system Q-factor slows down during the action of such an impact impulse. This is one reason why its Q-factor is saturated. During pause period between multiple impulses, the resistance to the material condition change is reduced (relaxation), while the Q-factor of the material, through the reduction in internal friction losses in the process of relaxation, increases up to saturation. This is further explained graphically in FIG. 2 as described below.

In addition, it should be considered throughout the description of the invention that there are three types of the Q-factor. The first type of Q-factor is the Q-factor of the oscillating system, which manifests itself during rebound of the tool from the treated surface. The second type of Q-factor is the associated Q-factor of the oscillating system under load, which manifests itself during impact, i.e., contact of oscillating body introducing the impulse and the treated body, such as when an intender of ultrasonic impact is in contact with both the concentrator tip and the workpiece surface. The third type of Q-factor is the material Q-factor that changes during impact and contributes to the associated Q-factor of the oscillating system under load. The material Q-factor is stabilized during pause as a result of relaxation of the action upon the material.

Thus, the method of modifying properties and producing materials with specified properties of the present invention comprises (1) affecting a material with a source of energy, such as an adaptively controlled impulse action, (2) evaluating the material's response to the effect based upon a set of criterion, (3) modulating, synchronizing and adapting the action of the source of energy upon the material based upon the material's response to the action to provide high quality, stability, consistency and uniform distribution of the effects upon the surface and within the volume of the material with minimum resistance by the material and therefore, minimum time and energy consumption, (4) affecting the material with the modulated, synchronized and adapted action of the source of energy, and (5) repeating steps (2) through (4) until the desired technical effect is attained in the material. As such, a flexible control algorithm for process parameters from the material's response to the action in real time is able to be utilized.

In the method of modifying and producing materials with specified properties, an energy signal, such as a certain sequence of heat, electromagnetic, beam, coherent, quasi-static, acoustic, thermo-dynamic, ultrasonic and other suitable energy types, is applied to a material to produce an effect, and during creation of the effect, the natural resistance response within the material. As the resistance increases, this response continues until a certain energy threshold is overcome and recurs as the effect continues. Eventually, the energy thresholds are overcome at the structural level and at least one desired technical effect is achieved.

A preferred embodiment of the method modifying and producing specified properties and conditions in materials with impulse treatment in accordance with the present invention is shown in FIG. 1. Specifically, a source of energy in the form of an energy signal is applied to a material, e.g., an object, as an initial action, i.e., initial impulse action, upon that material, wherein the material responds to this initial action. This response is then evaluated. As a result, a control signal is generated and a modulation type is selected. The modulation type is based upon amplitude, frequency and pulse-width of the action. Based upon the material's response to the initial action, the amplitude, frequency and/or pulse-width of the impulse action may be modified. The modulation may then be synchronized and an adaptive impulse action may be applied to the material. The material then responds to the adaptive action. This response is then evaluated to determine the action resistance control, quality indication, and excitation adjustment and action of the material. One or more of the modulation elements may again be modified, synchronized and applied to the material in the form of an adaptive impulse action wherein the material again responds to the adaptive impulse action. This series of steps may occur until the desired technical effect is attained in the material. The steps of the preferred embodiment of the method of the present invention are described in greater detail hereinafter.

In the method of impulse treatment of the present invention, the source of energy, and corresponding energy signal, is an impulse of energy applied to a targeted area of a material as an action, wherein the action may be included in the energy signal or be parallel therewith. The impulse action comprises normalized impulses and pauses, i.e., a controlled and adaptive alternation of periods of material condition impulse activation with periods of relaxation/pause therebetween. The impulses are controlled, i.e., normalized, by adjusting their frequency, amplitude and/or length. As such, each impulse is controlled such that a regular pulse provides a regular impact to the material so that a series of adaptively controlled impulses changes at least one specified property of the material to attain a desired technical effect with minimum resistance by the material throughout the series of controlled impulses, i.e., impulse treatment or impulse action. The impulses and pauses are in synchronism with the response in the material to the impulse action with minimum resistance determined by the material quality saturation in the treated area.

Each impulse is a small application of energy as compared to prior art applications. Each impulse, i.e., material condition impulse activation, of each impulse action is applied until the material reaches a resistance point. The resistance incurred due to the intermittent impulses, i.e., material condition impulse activation, is minimal resulting in a "soft" change in the material. "Soft" is in reference to the state of the material at the time resistance is initially felt and when a certain minimum resistance occurs in the treated area of the material. At this point the impulse, i.e., material condition impulse activation, is removed and the period of relaxation/pause follows. Each period of relaxation allows the material to recover from the previous impulse, i.e., material condition impulse activation, before the impulse, i.e., material condition impulse activation, of the next impulse action is applied so that the material is in an optimum condition to receive the impulse, i.e., material condition impulse activation, of the next impulse action. Since the changes in the material from each impulse are small, dissipation of resistance to a non-resistant state of the material is attained in a short time. Thus, coordination of the impulses and pauses, i.e., coordination of controlled and adaptive alternation of the periods of material condition impulse activation and periods of relaxation, is provided to achieve the desired change or modification in the treated material with minimum resistance by the material. A high frequency of impulses is possible because the required period of relaxation/pause after each impulse, i.e., period of material condition impulse activation, is minimal since the resistance of the material to the impulse, i.e., material condition impulse activation, is minimized due to the small amounts of energy applied during each impulse, i.e., period of material condition impulse activation. The minimum resistance is preferably determined by an asymptotic loss decrease and a respective proportional damping of the material's response to said impulse action.

Thus, any effect upon a material is accompanied by the effect resistance fluctuation, i.e., impulses or periods of material condition impulse activation, and relaxation of material condition (caused by material resistance) in the pauses between these fluctuations. As such, any effect on the material associated with the change in its characteristics or properties governs the generation of material condition fluctuations as the desired technical effects are attained. In this manner, inherent (individual) characteristic properties of a specific material can be found that are caused by a specific effect, which is accompanied by a well-defined frequency of an energy threshold overcoming resultant condition fluctuations and their transformation into stress waves at the structural level both at the surface and within the volume of the material or segments thereof.

The effect of the source of energy on the material is in synchronism and/or in phase with the resistance fluctuations. This synchronism eliminates an excess effect in the pauses, i.e., the periods of relaxation, between the impulses, i.e., periods of material condition impulse activation, and hence minimizes the resistance of the material in attaining a desired technical effect. This synchronism may also make possible local (fragmentary) frequency and amplitude-sensitive resonance that in turn may reduce the resistance to deformation effect and acceleration of diffusion in particular, similar to that of ultrasonic deformation.

There are three possible ways to synchronize the effect and the material's response thereto, preferably expressed in terms of the resistance fluctuations, i.e., impulses or the periods of material condition impulse activation, in real time by using the following signals: listening to the material during a directed condition change occurring therein, monitoring the change dynamics and the material quality saturation in the treated area and/or recording the macro-response of the material to the effect. These signals can be representative of both the characteristic parameters of the material and the related parameters that contain the information on the behavior of the material and a tuned controlling process device as the material is affected. The three ways to synchronize the effect and the material's response thereto are (1) to directly measure the acoustic signals of the structural noise; (2) to measure the material quality in the pause between the resistance fluctuations, i.e., the impulses or the periods of material condition impulse activation, under a certain action that suffices to attain a desired technical effect; or (3) to record the material's fundamental oscillation damping in the pauses between the actions in synchronism and/or in phase with the material's response to the action. While any of the three ways may be utilized, the choice of which synchronism to use may be determined by the specific task of modifying a specified property of a material or producing a material with a specified property.

The method of the present invention is based on using the information about the physical response of the material to the action in real time that is used to specify the method and process conditions of modifying specified properties of existing materials or producing materials with specified properties. In addition, the response is evaluated from the material resistance criterion in the treated area during modification of the material or production of the material.

FIG. 2 is a schematic representation of the treatment method implementation of the present invention based on the minimum resistance criterion. Referring to FIG. 2, each impulse action ($T_1$) comprises an impulse or a period of material condition impulse activation, i.e., the characteristic time for the material resistance to attain a specified technical effect ($t_1$) and a period of relaxation/pause, i.e., characteristic time to relax action resistance ($T_1$-$t_1$). As illustrated by FIG. 2, during the impulse or period of material condition impulse activation ($t_1$), the energy signal power W (1) of the source of energy applied to the material increases. During that same period, the resulting material quality Q (2) also increases toward the desired technical effect level, while the impact action resistance $R_i$ (3), i.e., resistance activation, decreases towards the desired technical effect level. The resistance of the material to the action $R_{ch}$ (4) is low and near the desired technical effect level at the beginning of the period of material condition impulse activation ($t_1$), but then greatly increases towards the end of the impulse or period of material condition impulse activation ($t_1$).

During the period of relaxation/pause ($T_1$-$t_1$) of the impulse action ($T_1$), the energy signal power W (1) is removed from the material, the resulting material quality Q (2) remains increased and constant near the desired technical effect level, while the impact action resistance $R_i$ (3), i.e., resistance activation, remains low and decreased near the desired technical effect level. Also, the resistance of the material to the action $R_{ch}$ (4) greatly decreases throughout the period of relaxation/pause ($T_1$-$t_1$) of each impulse action ($T_1$) toward the desired technical effect level. The resistance of the material is evaluated in real time from the material quality in the treated area, while the minimum material quality, as the obtained result criterion, is evaluated from the saturation of the material loss characteristic.

The manner of affecting the material is chosen with regard to the nature and parameters of the material's response to the effect on the material, while the response is expressed in terms of the resistance to the effect during the modification of a specified property of a material or the production of a material with a specified property.

Thus, conditions of the impulse effect upon the material are specified according to which impulse energy parameters (amplitude and length) are selected on the condition of attaining a specified modification effect in a material or producing a material with a specified property with minimum resistance to this effect. Meanwhile, the pause between each impulse, i.e., period of material condition impulse activation, of each impulse action is chosen so that it is sufficient for relaxing the material condition in the treated area, thereby reducing the resistance of the material to the action so that the material is in the optimum condition to receive the impulse, i.e., material condition impulse activation, of the next impulse action.

The parameters of the carrier energy signal, i.e., impulse action, including the frequency, amplitude and length of the carrier energy signal, are then determined. Specifically, the frequency of the carrier energy signal is set as a multiple of the impulse repetition rate based on the condition of the optimum energy transfer to the material being affected as the desired technical effect is attained. The amplitude is specified and determined so that it suffices to provide the impulse energy as defined by the task of modifying or producing a specified property in a material or object. At a given amplitude, the length, i.e., pulse width, is specified and determined so that a desired technical effect, which is related to a single impulse, is attained with a minimum resistance of the material to this single action.

Once the carrier energy signal parameters, i.e., impulse action parameters, are determined, the method is chosen for generating signal impulses by modulating the frequency, amplitude, pulse-width or a combination thereof. In doing so, account must be taken of the basic modulation parameters that were set upon the analysis of the material's characteristic properties in the context of the desired technical effect to be attained.

Figure 3:
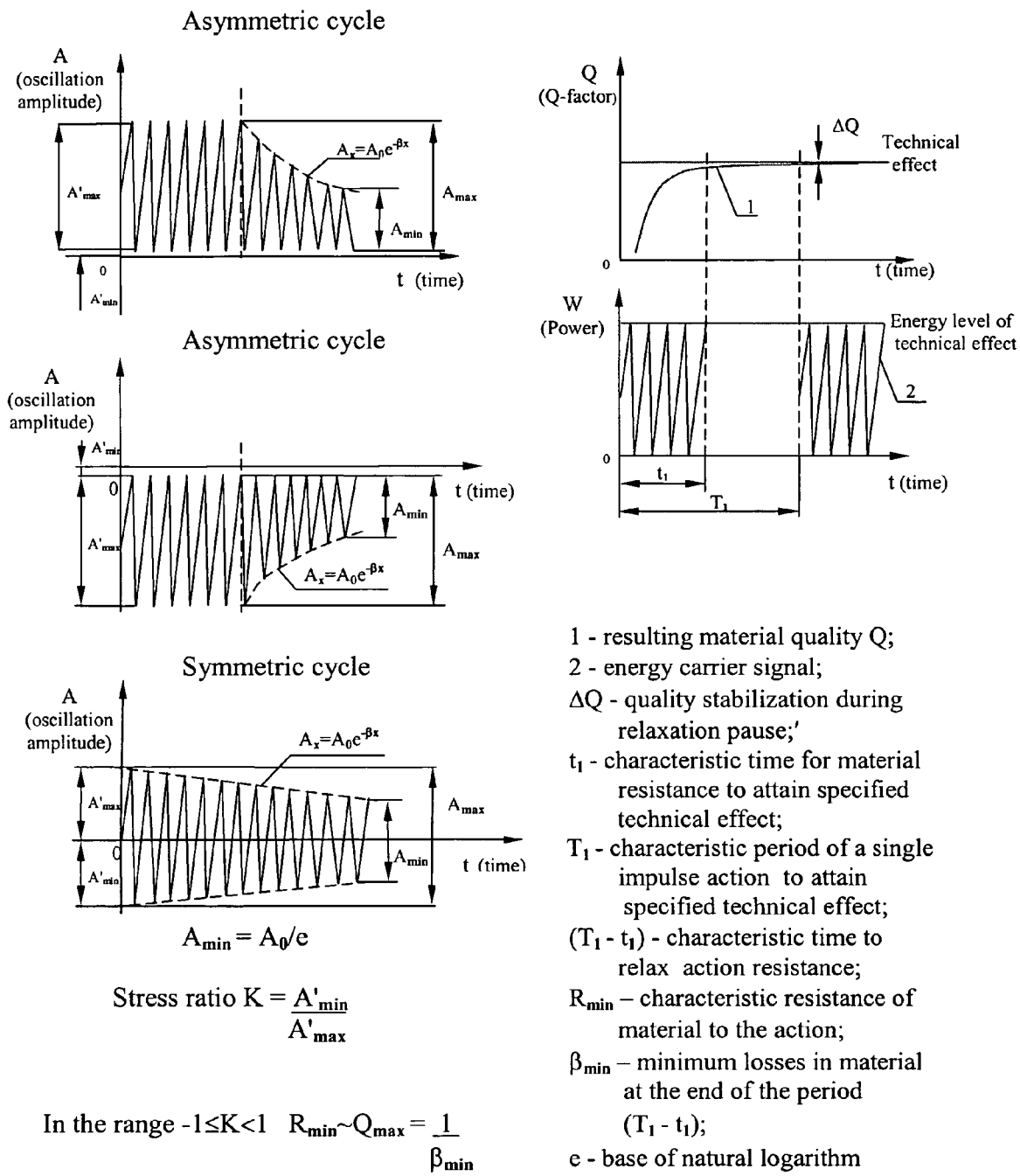
FIG. 3 is a schematic representation of the energy carrier signal shape change based on the material quality saturation criterion in accordance with the present invention.

FIG. 3 represents a schematic representation of the energy carrier signal shape change based on the material quality saturation criterion, i.e., resulting material quality Q, of the present invention. In a preferred embodiment, a waveform of the carrier energy signal is changed within the stress ratio range from "−1" to values greater than 0 such that the waveform is maintained and based upon the conformity to a desired technical effect in accordance with the material quality saturation in the area of action with a minimum resistance thereto. The maximum stress ratio value is plus 1 (+1). This maximum range, however, is not meaningful in a practical and physical sense since no oscillations would exist at such level and the waveform would be static. Referring to FIG. 3, the stress ratio is expressed as:

$$K = \frac{A'_{min}}{A'_{max}};$$

in the range $-1 \leq K < 1$. In addition, the characteristic resistance of the material to the action is similar to the resulting material quality. Both of these are then indirectly proportional to the minimum losses in the material at the end of the period $(T_1-t_1)$. This is expressed equationally as:

$$R_{min} \sim Q_{max} = \frac{1}{\beta_{min}}$$

The material's response to the action can also be determined from the current of the carrier energy signal, when a current can be used, as the desired technical effect is attained, to control the parameters of the carrier energy signal and modulating impulses. FIG. 4 is a schematic representation of the material response measurement from the current of the carrier energy signal. As shown in FIG. 4, during the characteristic time for material resistance to attain the specified technical effect $(t_1)$, i.e., impulse or period of material condition impulse activation, the current strength I (1) increases, while the resulting material quality Q (2) increases toward the desired technical effect level and the characteristic resistance of the material to the action $R_{ch}$ (3) is low and near the desired technical effect level during the beginning of the impulse, i.e., period of material condition impulse activation, $(t_1)$ and then greatly increases towards the end of the impulse, i.e., period of material condition impulse activation $(t_1)$. During the period of relaxation/pause, i.e., characteristic time to relax the action resistance $(T_1-t_1)$, of the impulse action $(T_1)$, the current strength I (1) is removed, the resulting material quality Q (2) remains increased and constant near the desired technical effect level, and the resistance of the material structure to the action $R_{ch}$ (3) greatly decreases towards the desired technical effect level.

In accordance with the characteristic properties of the material under specific conditions to reach the desired technical effect, the energy and the length of impulses, i.e., material condition impulse activation, and the length of the pauses in between thereof are controlled within the entire range of parameters: from random stochastic to those controlled by the change in the amplitude, off-duty factor (the ratio between the impulses and pauses, i.e., the ratio between the material condition impulse activation length and the period of pause between impacts), and repetition rate, i.e., frequency, as defined by the task. While achieving the desired technical effect of modifying a material to attain a specified structure, condition or property, the control sequence of the impulse effect upon the material is determined with consideration for the change in dynamics of the resistance of the material to this effect. FIG. 5 shows the control of impulse energy, impulse length and the pauses in between over the entire parameter range of a controlled parameter range as compared to a random parameter range which reflects random stochastic and not control of features as in the claimed invention.

In a preferred embodiment, the controlled parameters of ultrasonic impact, which are in synchronism and/or in phase with the response in the material to the ultrasonic impact, are based on a criterion of minimum resistance to the ultrasonic impact on the material upon attaining the at least one technical effect which is identified by the material quality saturation in the area treated in the material. The controlled parameters preferably include one or more of the following parameters: ultrasonic impact length wherein the length is a cumulative time when an indenter simultaneously contacts the material and an ultrasonic transducer tip, as well as ultrasonic oscillations of an indenter in a gap between the material and the ultrasonic transducer tip; pause duration between ultrasonic impacts; repetition rate or off-duty factor of impacts at a given impact length or pause between impacts; impact density related to a unit area of a treated surface or a unit time of treatment by ultrasonic impacts; impact efficiency which comprises an area or volume of a single indentation or a volume of material with plastic deformations induced into said material; amplitude and frequency of carrier ultrasonic oscillations; amplitude of impact rebound caused by carrier oscillations of ultrasonic frequency; static pressure exerted on a surface of the material and accompanying a process of ultrasonic impact initiation; a coupling level in a system source of ultrasonic mechanical oscillations; an equivalent mass, natural frequency and equivalent elasticity of the equivalent mass in a point of impact, and an acoustic elasticity, mass and configuration of an impacting element.

Figure 6:
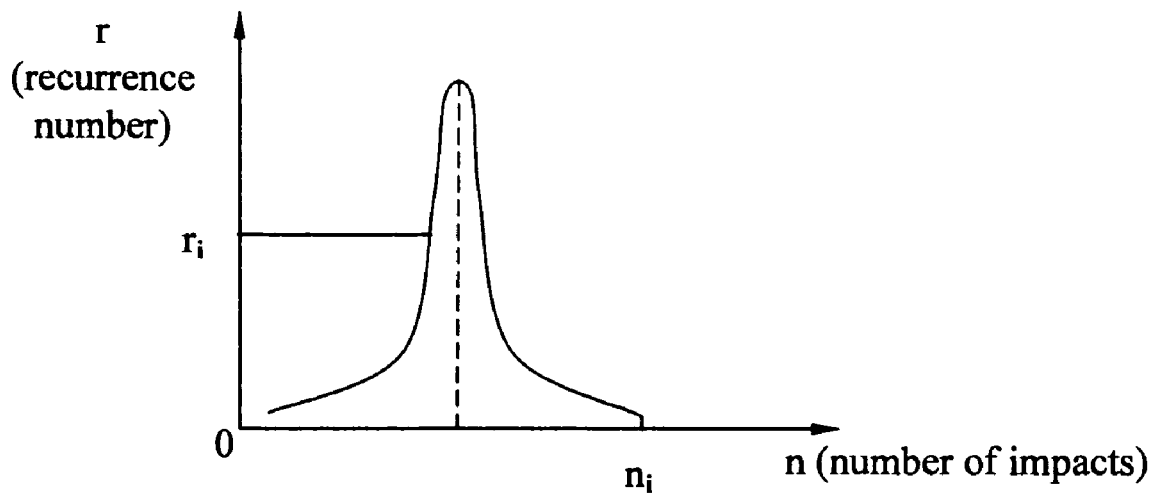
FIG. 6 is a schematic representation of the algorithmic control criterion of parameters of the impulse action on a material in accordance with the present invention.

Referring to FIG. 6, in accordance with the method of the present invention, the algorithmic criterion of controlling parameters of the impulse action upon the material is the probability control factor that reflects the scatter of the resistance parameters based on the analysis results of the material's characteristic properties under conditions of the desired technical effect. Accordingly, a probabilistic control coefficient $(k_i)$ is a dimensionless function expressed by the ratio between the number of parameters of the response to the impulse action, i.e., the number of parameter recurrence $(r_i)$, and the total number of impulses, i.e., number of impacts $(n_i)$, which is sufficient to attain the desired technical effect. On this basis, the basic condition of implementing and defining the method of the present invention makes it possible to control the parameters of action upon the material within the change range of the control probability factor from 0 to 1 and inversely, while this coefficient is determined by the characteristic parameters of the material resistance to the action as the desired technical effect is attained.

Figure 7A:
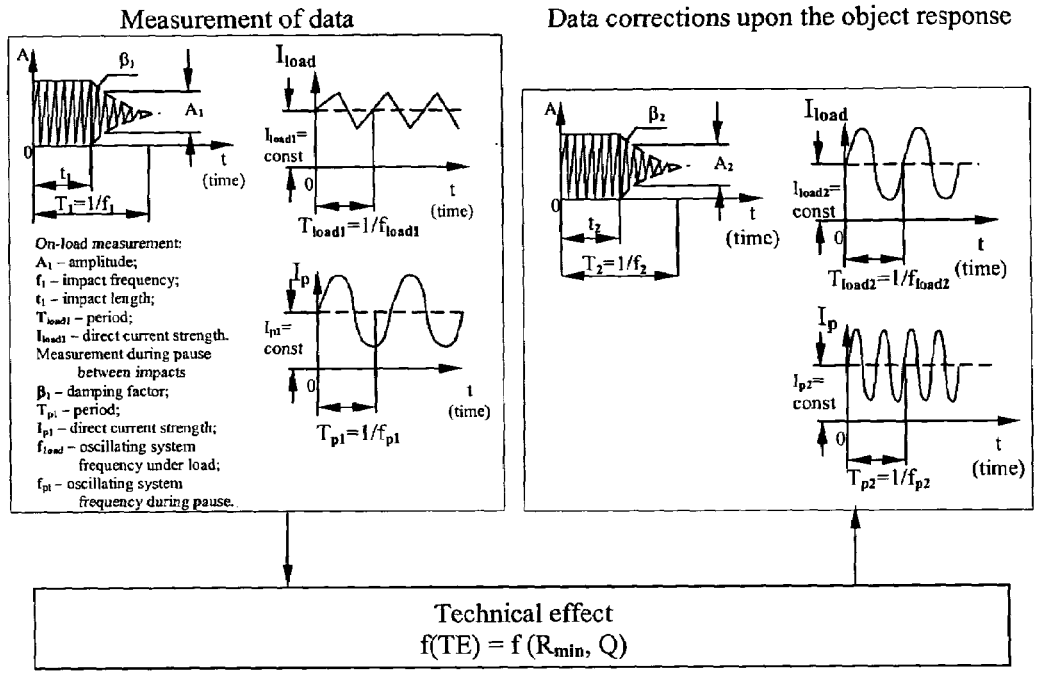
FIGS. 7(a)-7(b) are schematic representations of measurement of reference data and parameters during an actual impulse treatment process and in-process control algorithm in accordance with the present invention.
Figure 7B:
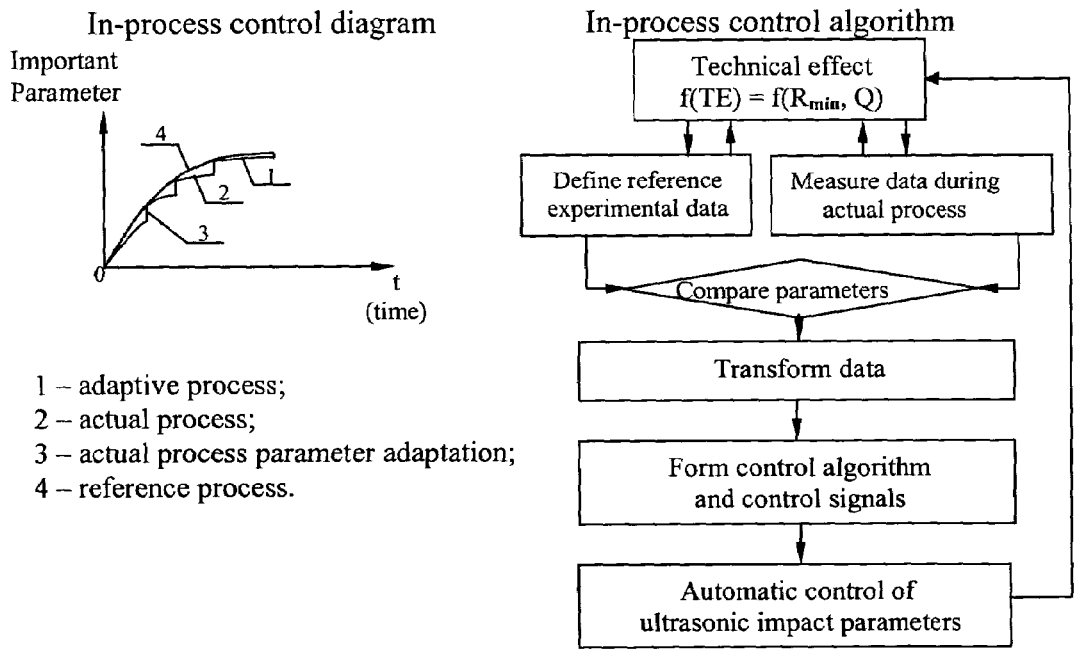

The method of the present invention provides for all necessary conditions for in-process control over the course of affecting a material as the desired technical effect is attained. In a preferred embodiment of the method of the present invention, all necessary conditions for in-process control over the course of affecting a material to achieve a desired technical effect may be attained with the use of ultrasound as the energy source. Referring to FIGS. 7(*a*) and 7(*b*), a preferred in-process control is as follows:

(1) define and pre-determine the experimental reference data by measuring the ultrasonic oscillating amplitude, the impact frequency and length, and the current parameters under loaded conditions during ultrasonic impact excitation, as well as the current parameters and the damping factor of natural oscillations in the system, which includes the ultrasonic resonant body, impact elements and treated material (UIM) in the pauses between the ultrasonic impacts that characterize the material's response to the action and the change in its related quality upon attaining a desired physical and/or technical effect or interdependent combinations thereof;

(2) measure the oscillating amplitude, the impact frequency and length, and the current parameters under loaded conditions during ultrasonic impact excitation, as well as the current and the damping factor of natural or fundamental oscillations of the UIM system in the pauses between the ultrasonic impacts that characterize the material's response to the action and the change in its related quality during actual operational process with application of ultrasonic impact treatment;

(3) compare the oscillating parameters of UIM system during actual process with the experimental reference data;
(4) determine (calculate) the agreement between the experimental reference data and actual current data obtained by comparison and correct this based on the desired technical effect;
(5) convert data in control code;
(6) generate a control algorithm and control signals from the material's response to the action and the dynamics of its related quality saturation in the affected area; and
(7) automatically controlling ultrasonic impact parameters in UIM, which are adequate for obtaining the desired technical effect.

The following examples of the application of the method of the present invention are intended to illustrate the invention and not to limit the present invention in any manner.

Metal machining: Metal machining is accompanied by a consecutive sequence of elastic and plastic deformations, hardening, overhardening, metal tearing off the treated surface at the chip root and the forward crack that is constantly formed before the cutting tool during machining. Utilizing the method of the present invention, these repetitive processes which cause high-intensity stress fluctuations at the deformation center, can easily be brought to a favorable synchronous and in-phase exchange of resonance displacements of the cutting tool and the stressed area in the chip root under certain conditions with an acoustic tuning of the elements of the system "workpiece-tool-machine" as further described below. Specifically, the stress fluctuation in the deformation center is measured, a tuned acoustic vibrating system is built, response of this system to a tool-workpiece load is measured, ultrasonic impulses in synchronism and/or in pause with response parameters is generated and in-process control is activated. This results in a multiple reduction in cutting resistance of steels, including high-strength steels, and alloys, improvement in machining accuracy and tool life, and broadening of a machine's capabilities. In this example, the modulation, the efficiency of natural stress fluctuations at the deformation center and the regulated cutting resistance reduction are enhanced by ultrasonic impulses from the external energy source with minimum energy consumption in accordance with the method of the present invention.

Figure 8:
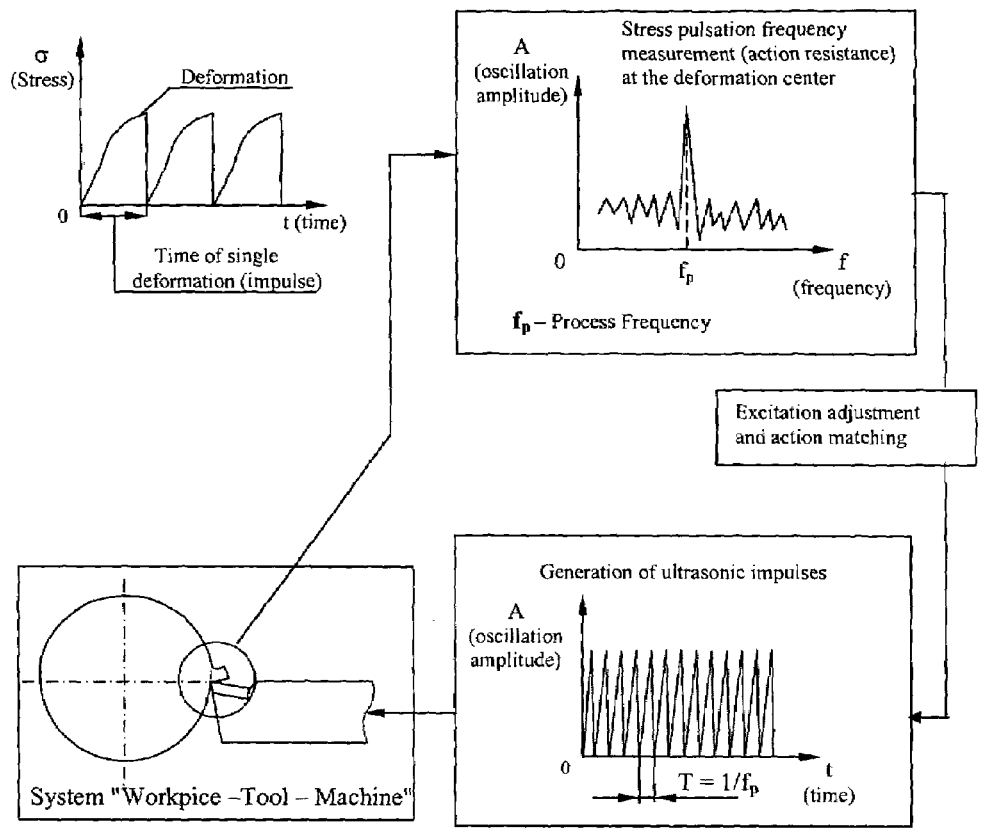
FIG. 8 is a schematic representation of a machining process acoustic activation in accordance with the present invention.

Referring to FIG. 8, a schematic representation of an acoustic activation machining process is illustrated. As such, FIG. 8 graphically illustrates the relation between the deformation, the stress pulsation frequency measurement (action resistance) at the deformation center, the excitation adjustment and action matching, and the generation of ultrasonic impulses of the present invention used in conjunction with a machining process.

Arc welding: Arc welding is accompanied by an intense heating of molten metal and base metal, heat rejection from a weld zone, and the formation of temperature gradients. These interdependent processes necessitate introduction of additional energy into the molten pool to attain the proper temperature and provide for weldability in cooler zones, while an excess energy, and hence the heat input, causes the formation of areas with unfavorable residual stresses and deformations on cooling of the molten pool and weld metal. Thus, the characteristic resistance of the molten metal expressed by the above circumstances places some restrictions on the welding process efficiency.

The method of the present invention minimizes the resistance to the energy introduction into the molten metal and weld by minimizing its level in each individual impulse and by relaxing the weld conditions in the pause before the next impulse. Accordingly, heat input minimization and relaxation of the molten metal and weld metal condition in the pauses between the impulses have a favorable effect on the structure of the welded joint metal and its mode of deformation. The efficiency specified by the method of the present invention is provided by selecting the repetition rate of the welding current energy impulses or oscillation of the welding electrode or weld material, such as filler material, as defined by the task. Specifically, arc welding is performed in accordance with the method of the present invention by using a current of ultrasonic frequency which is modulated by normalized impulses having amplitude, length and repetition rate set based on related criteria of heat input minimization, specified quality of the weld metal and near-weld zone, residual stress and deformation minimization and providing specified process efficiency.

Figure 9:
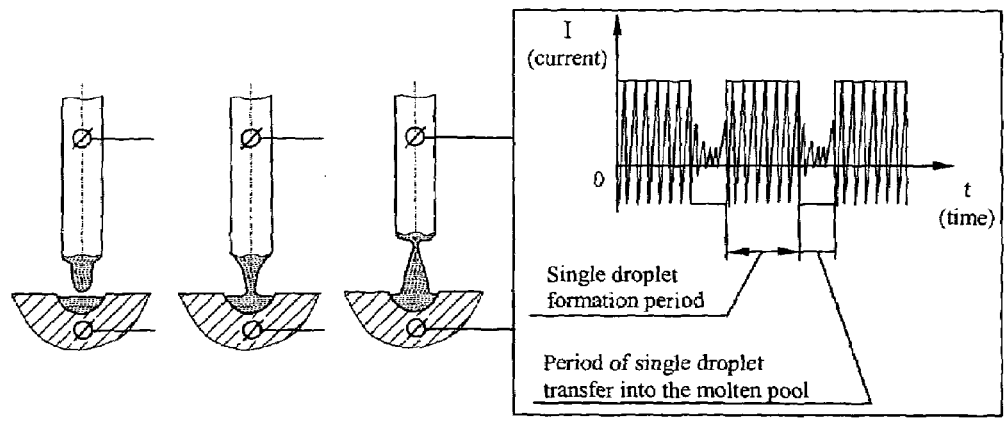
FIG. 9 is a schematic representation of arc welding with a current of ultrasonic frequency in accordance with the present invention.

FIG. 9 is a schematic representation of arc welding with a current of ultrasonic frequency. As shown, the single droplet formation period corresponds to the impulse, i.e., period of material condition impulse activation, of each impulse action. Also, the period of single droplet transfer into the molten pool corresponds to the period of relaxation or pause between each impulse, i.e., period of material condition impulse activation.

Figure 10:
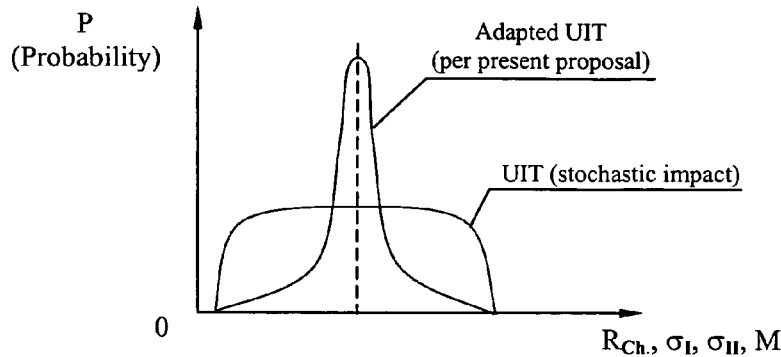
FIG. 10 is a schematic representation of ultrasonic impact treatment (UIT) adaptation in accordance with the present invention.

Ultrasonic impact treatment (UIT): Conventional ultrasonic impact treatment (UIT) is accompanied by random impact events that, along with all positive characteristics of the process, result in possible non-uniform treatment, possible over-hardening of the treated areas of the metal from using too many passes, possible failure of favorable mesostructure, and excessive energy consumption and non-uniform characteristics of the intervals of favorable introduction of ultrasound into the treated material. The method of the present invention solves these problems of UIT. Specifically, when used with UIT, the method of the present invention provides controlled impacts, uniform treatment of the material, reduction in the possibility of over-hardening of the treated areas of the material, strengthened mesostructure, minimal energy consumption and uniform characteristics of the intervals of ultrasound introduced into the treated areas of the material. The method of the present invention also extends the area of application of this advanced UIT technology under industrial conditions with stringent requirements on interchangeability, normalization and consistency of the process which results in the production of a wide range of machinery and aviation, marine, space, automobile and rail transport. As shown in FIG. 10, UIT adaptation, i.e., UIT used in accordance with the method of the present invention, results in a narrower, more defined, more uniform range of desired properties when compared to the resulting properties of stochastic impact UIT.

Figure 11A:
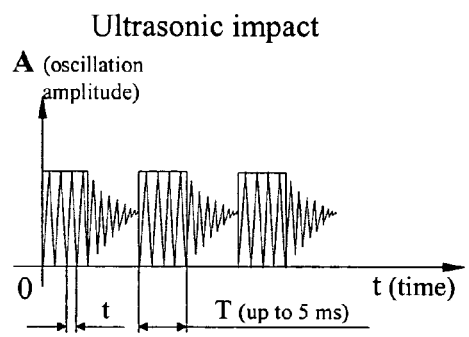
FIGS. 11(a)-11(c) are schematic representations of the generation of an ultrasonic wave by ultrasonic impact in accordance with the present invention.
Figure 11B:
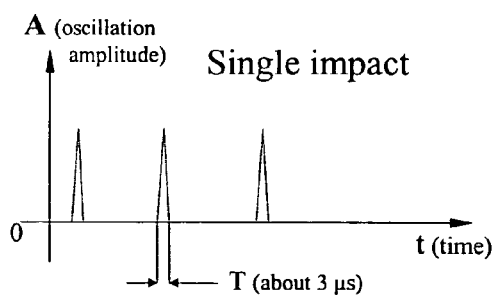
Figure 11C:
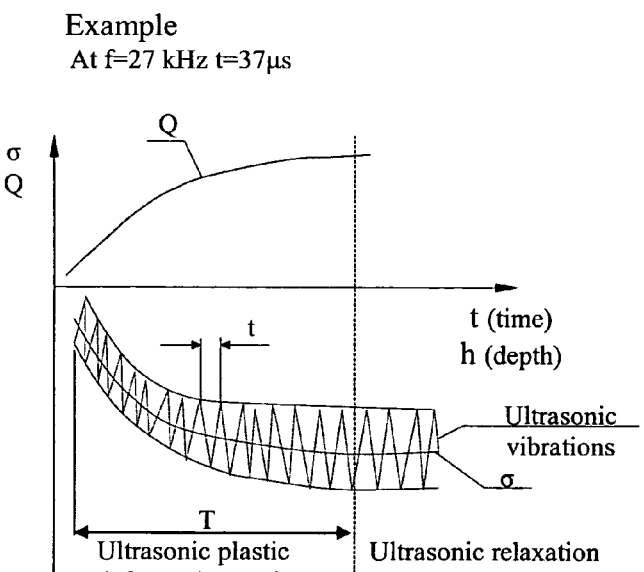

Introduction of ultrasound by UIT: In addition to the details set forth above, ultrasonic impact treatment (UIT) is accompanied by ultrasonic impact, wherein its length is radically different from that of single impacts initiated, for example, during ultrasonic peening. Ultrasonic impact is an effective method of ultrasound transportation into materials such as metals. In accordance with the method of the present invention, UIT optimizes the introduction of ultrasound into a material, and controls the introduction parameters and duration of the effect. As such, ultrasound is transferred into a material through the area of ultrasonic plastic deformation and is independent of the introduction of any surface conditions, as shown in FIGS. 11(a)-11(c). Specifically, FIGS. 11(a)-11(c) illustrate an example of the generation of ultrasonic waves by ultrasonic impact. In the region of ultrasonic plastic deformation (T), i.e., impulse or period of material condition impulse activation, the stresses in the impact area ($\sigma$) and the resulting material quality (Q) decrease and then remain substantially constant during the region of ultrasonic relaxation, i.e., period of relaxation.

The basic condition for the effective introduction of ultrasound into a material, along with the metal saturation in the area of ultrasonic impact with plastic deformations, is the improvement (up to the saturation) of the quality of the "tool-object" oscillating system that attends this process. Specifically, the magnetostriction feedback signal is an objective source of information about losses in the transducer and the mass of the object acoustically attached thereto. In the process of treatment, the physical state and amount of the attached mass change. Hence, the total (resulting) Q-factor of the "tool-object" oscillating system also changes. When it is considered that as plastic deformations are accumulated, the reflection power of the object surface increases (up to saturation) in the area of action. Then, the resistance to the object oscillations due to the action will decrease, while the Q-factor, as evidence that the losses decrease in this constantly transformed oscillating system, constantly increases up to a certain value, termed saturation, that corresponds to a desired technical effect.

Ultrasonic impact treatment in accordance with the method of the present invention may now be utilized to address an increasing number of engineering problems, such as, but not limited to, increase in resistance to fatigue, stress corrosion, contact and abrasive failures, ageing, corrosion and thermo-mechanical fatigue, increase in load-carrying capacity, resistance to dynamic, variable and quasistatic loads at the level of material strength in the atmosphere and aggressive environments, compensation for residual stress and deformation effects, relaxation, increase in diffusion rate in processes conditioned by this effect, increase in quality and structure of casting, weld metal, powder, composite and clad materials, improvement in quality of material structure and adhesion efficiency in non-detachable joints and protective coatings.

Volumetric ultrasonic treatment (VUT): Volumetric ultrasonic treatment (VUT) is the implementation of ultrasonic treatment by ultrasonic impacts with the ultrasonic impacting tool rigidly fixed in place. A material is impulse affected ultrasonically at its fundamental frequencies which are generated as described above. In accordance with the method of the present invention, modification of the material condition, property or structure is controlled during the process.

VUT is performed under or without distributed static pressure upon the material, distributed dynamic loading, distributed heating, in a vacuum or inert gas, in a chamber with a special environment, in a process bath, or in the open air. One example of VUT application is the beneficial relaxation treatment of large structures of complex geometry. In accordance with the method of the present invention, volumetric ultrasonic treatment reduces residual stresses and deformations and allows heat treatment to be omitted. In this process, the energy consumption is reduced by several orders of magnitude since the VUT is accompanied by the uniform distribution of ultrasonic waves and stress impulses in the material and directly affects the volume of the material, which is unlike heat treatment that is accompanied by heat abstraction into the ambient air.

FIGS. 12(a)-12(e) show an example of volumetric ultrasonic treatment upon a material and the relationship between the necessary ultrasonic stress amplitude and residual stress level during relaxation. Specifically, many welded structures have a residual stress profile near critical level (near to or greater than 0.7 times the yield point of the material) for example for fatigue. In such situations, the larger the residual stress the smaller the required ultrasonic stresses to have a positive effect to change the stress profile of the structure. In other cases where the residual stress profile is smaller and requires relaxation (near to and less than 0.5 times the yield point of the material) for example for geometric stability in time of use, in the case the lower the residual stresses the larger the required ultrasonic stresses required for positive change of the stress profile.

Ultrasonic elimination of structural defects: The method of the present invention provides structural defect elimination by local or volumetric effect on the material being treated. These defects may include sub-surface pores, microcracks, hazardous vacancy and dislocation clouds, large grains, dendrites, diffusion hydrogen, hidden structural stress concentrations, mesostructure defects, and laminations. The effect of ultrasonic defect elimination is based upon the enhancement of diffusion, plastic deformation, recrystallization, and relaxation processes within the material. This effect is governed by the combination, or the independent effect, of ultrasonic waves and oscillations on the material surface or volume, elastic and plastic deformations caused by the ultrasonic impact under or without distributed static pressure upon the material, distributed dynamic loading, distributed heating, in a vacuum or inert gas, in a chamber with a special environment, in a process bath, or in the open air.

Figure 13:
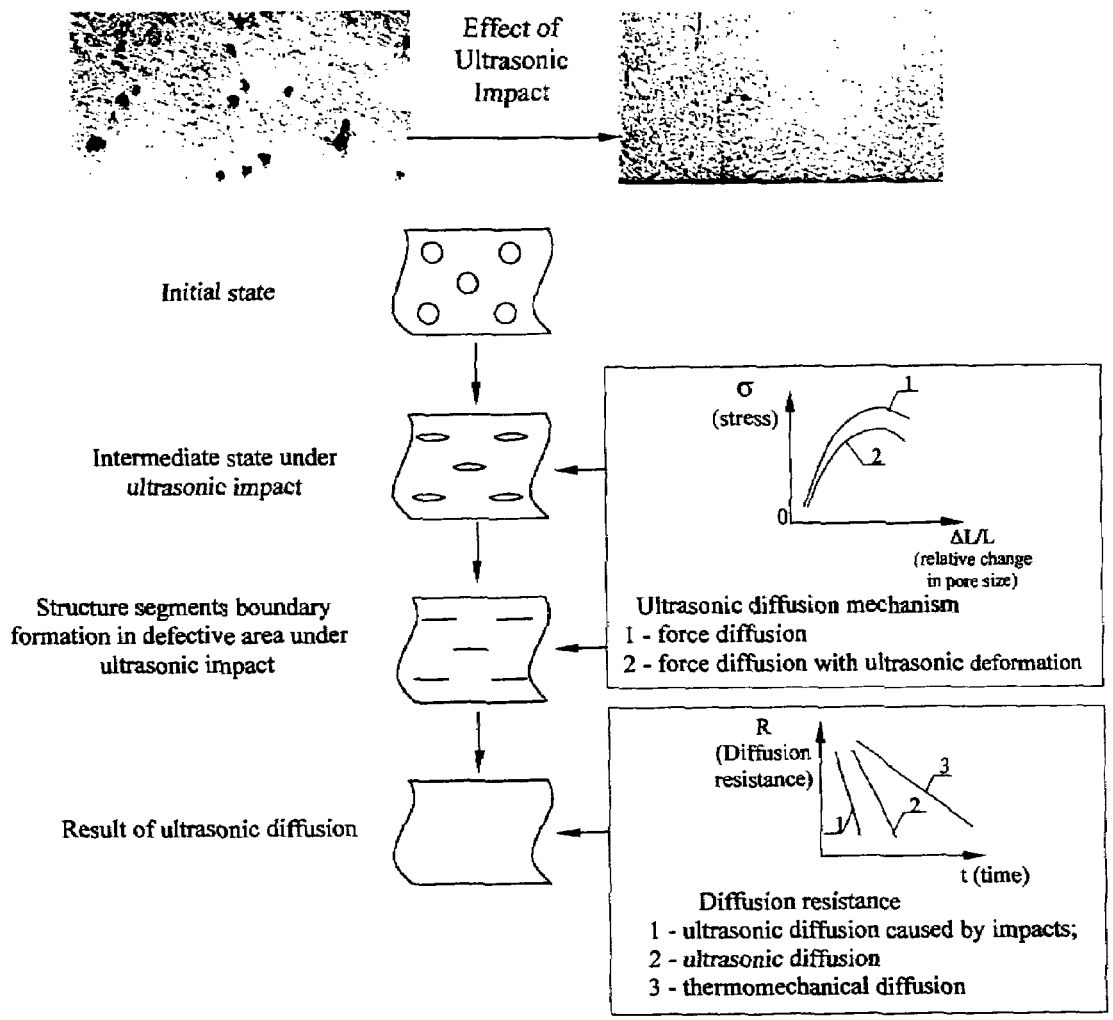
FIG. 13 is a schematic representation of the elimination of structural defects by the effect of ultrasonic impact in accordance with the present invention.

FIG. 13 shows the elimination of structural defects by the effect of ultrasonic impact in accordance with the method of the present invention. With ultrasonic impact in accordance with the method of the present invention, structural defects in the treated area of the material are reduced. Specifically, a material subjected to force diffusion with ultrasonic deformation has a lower number of stresses during the relative deformation than a material subjected to force diffusion alone. Additionally, a decrease in diffusion resistance is accomplished in a shorter amount of time with ultrasonic diffusion caused by impacts as compared to ultrasonic diffusion alone or thermo-mechanical diffusion, as shown in FIG. 13.

Heat treatment (HT): Some features of heat treatment have already been addressed above. The method of the present invention utilized during a heat treatment process increases the effectiveness and extends the range of allowable temperature intervals within which specified phase transformations in the material are allowed. This result is attained by considering the characteristic resistance of the material to the heat action and accompanying this action by impulses of tuned ultrasonic impulses with pauses that suffice to relax the material structure disturbances caused by a single ultrasonic impulse. Specifically, in accordance with the method of the present invention, a material is heat treated using an ultrasonic impact tool as a detecting means of the response of the material to the action, and as a source of normalized ultrasonic impulses and pauses in between that suffice to activate diffusion and structural changes in the material as defined by the task based upon the algorithm of the in-process control.

A schematic diagram of heat treatment control and activation is shown in FIGS. 14(a)-14(c). Referring to FIGS. 14(a)-14(c), each impulse action ($T_1$), i.e., period of a single action, comprises a characteristic time for material resistance to attain a specified technical effect ($t_1$), i.e., impulse or period of material condition impulse activation, and a characteristic time to relax the action resistance ($T_1$-$t_1$), i.e., period of relaxation/pause. As illustrated by FIG. 14(a), during the impulse, i.e., period of material condition impulse activation ($t_1$), the response of the oscillating system to the ultrasonic impact by current (4) increases. During that same period, the resulting material quality (1) increases toward the technical effect level, while the impact action resistance (2), i.e., resistance activation, is high at the beginning of this period and then greatly decreases toward the technical effect level. The characteristic resistance of the material to the action (3) is low and near the technical effect level at the beginning of the impulse, i.e., period of material condition impulse activation ($t_1$), but then greatly increases near the end of the impulse, i.e., period of material condition impulse activation ($t_1$).

During the characteristic time to relax the action ($T_1$-$t_1$), i.e., period of relaxation/pause, of the impulse action ($T_1$), the response of the oscillating system to the ultrasonic impact by current (4) is removed from the material, the resulting material quality (1) remains increased and constant near the desired technical effect level, while the impact action resistance (2), i.e., resistance activation, remains low and decreased near the desired technical effect level. Also, the characteristic resistance of the material to the action (3) greatly decreases towards the desired technical effect level throughout the time of relaxation/pause ($T_1$-$t_1$) of each impulse action ($T_1$). FIG. 14(b) illustrates how temperature affects the technical effect region and FIG. 14(c) illustrates how time affects the technical effect region.

While the above examples are illustrative of the application of the method of the present invention, the preferred embodiment of the present method may be applied to, but not limited to, arc welding, heat welding, resistance welding, friction welding, friction stir welding, ultrasonic welding, diffusion welding, pressure welding, electron-beam welding, laser welding, heat treatment, thermal-mechanical treatment, electric-spark treatment, ultrasonic treatment, ultrasonic impact treatment, galvanization, application of coatings of specified physical and mechanical characteristics, surface finishing, soldering, manufacture of adhesive joints between metals and non-metals, application of adhesive metal coatings, electric-arc methods of producing cast alloys and casting with specified properties, machining, forming of metals and alloys and any other suitable application.

While the method of the present invention may be utilized with various applications, the areas of possible application of the method depend upon the desired technical effects, either singly or in the aggregate, upon the structure, condition or property of the material which are to be attained by the impulse treatment, i.e., impulse action. In a preferred embodiment, the method of the present invention is utilized with ultrasonic impact treatment. FIGS. 15-27 illustrate some of the physical effects and conditions of attaining the desired technical effects of ultrasonic impact treatment. These technical effects of ultrasonic impact action comprise creation of optimal conditions for ultrasonic transmission into a material or object, such as a joint; reduction in diffusion resistance; reduction in mosaic block size of a material; reduction in deformation resistance during ultrasonic impact; activation of vacancies, dislocations and shear planes; plastic deformations and resultant stresses; normalization of depths and distributions thereof in a material; distribution of stresses of the second kind, i.e., residual stresses formed within the microscopic regions of a material; normalization of a material mesostructure and protection against dynamic failures due to impact; normalization of the microhardness and distribution through a depth of a material; recrystallization of a material; degassing; increase in resistance to structural and liquation defect formation; normalization of the crystallization conditions and grain sizes in cast alloys and welded joints; amorphization of the structure of a material, i.e., transforming the structure of a material or joint into an amorphous state; stress relaxation; compensation, directed distribution and redistribution of deformations; elimination of structural defects; and production of a white layer.

Figure 15:
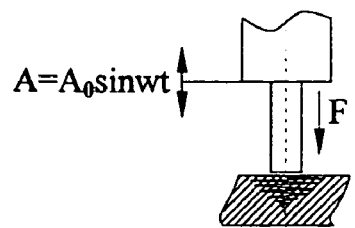
FIG. 15 is a schematic representation of the transfer of ultrasound into a material, which is a possible technical effect of ultrasonic impact action in accordance with the present invention.
Figure 16:
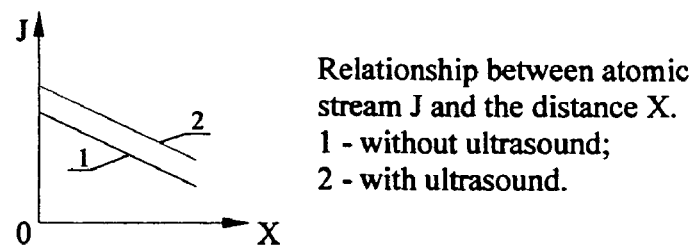
FIG. 16 is a schematic representation of the diffusion resistance reduction, which is a possible technical effect of ultrasonic impact action in accordance with the present invention.
Figures 17A, 17B:
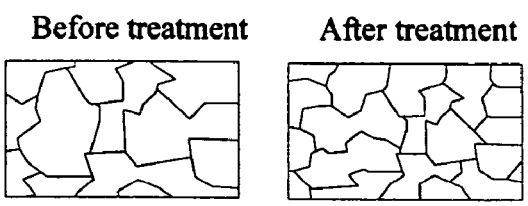
FIGS. 17(a)-17(b) are schematic representations of the transfer reduction of mosaic block size of a material, which is a possible technical effect of ultrasonic impact action in accordance with the present invention.
Figure 18:
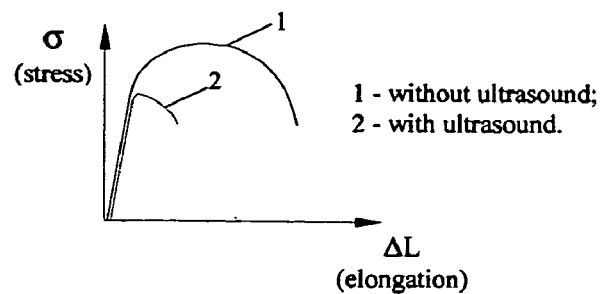
FIG. 18 is a schematic representation of the reduction in dislocation resistance during ultrasonic impact, which is a possible technical effect of ultrasonic impact action in accordance with the present invention.

FIGS. 15-27 illustrate some of these various technical effects of ultrasonic impact action in accordance with the method of the present invention and as described above. For example, FIG. 15 illustrates the transfer of ultrasound into a material. FIG. 16 illustrates the technical effect of diffusion resistance reduction. Specifically, the speed of diffusion is greater in a material treated with ultrasound than in a material which is not treated with ultrasound. FIGS. 17(a) and 17(b) illustrate the reduction of mosaic block size and densification thereof in a material after the material is treated with ultrasound (impulse), which is a desired technical effect. Specifically, treatment with ultrasound reduces the mosaic block size of a material. FIG. 18 illustrates the technical effect of reduction in dislocation resistance during ultrasonic impact. Specifically, stresses in a material are greatly reduced when ultrasound is applied to a material in accordance with the method of the present invention as compared to the stresses in a material where ultrasound is not applied.

Figure 19A:
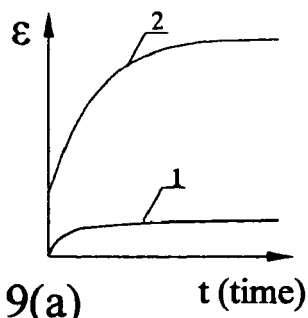
FIGS. 19(a)-19(b) are schematic representations of the activation of vacancies, dislocations and shear planes, which are a possible technical effect of ultrasonic impact action in accordance with the present invention.
Figure 19B:
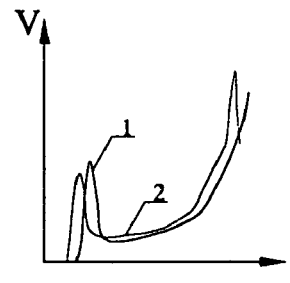
Figure 20:
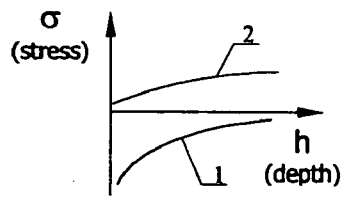
FIG. 20 is a schematic representation of the normalization of compressive stress distribution, which is a possible technical effect of ultrasonic impact action in accordance with the present invention.

FIGS. 19(a) and 19(b) illustrate the technical effect of activation of vacancies, dislocations and shear planes. Specifically, the relative deformation of a material is greatly increased under the effect of ultrasound than without the effect of ultrasound. Additionally, the average velocity of mobile dislocations of relative deformations is also increased under the effect of ultrasound than without the effect of ultrasound. FIG. 20 illustrates the technical effect of normalizing compressive stress distribution throughout the depth of a material with and without the application of ultrasound. Specifically, the normalization of compressive stress distribution throughout the depth of a material is higher with treatment of ultrasound than without treatment with ultrasound.

Figure 21:
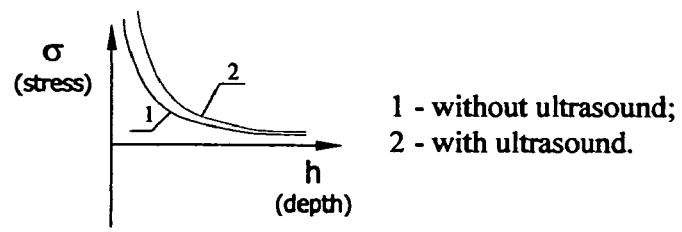
FIG. 21 is a schematic representation of the distribution of stresses of the second kind, which is a possible technical effect of ultrasonic impact action in accordance with the present invention.
Figure 22:
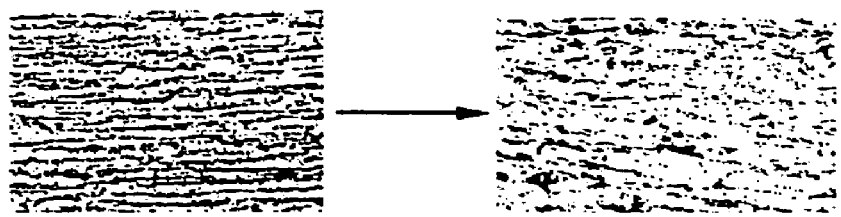
FIG. 22 illustrates the normalization of mesostructure, recrystallization and normalization of grain size of a material, which is a possible technical effect of ultrasonic impact action in accordance with the present invention.
Figure 23:
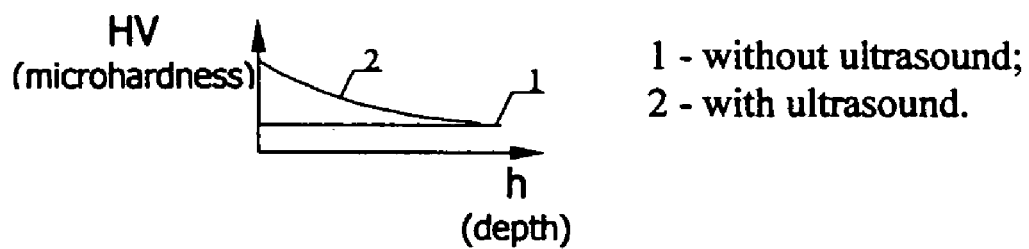
FIG. 23 is a schematic representation of the normalization of microhardness distribution, which is a possible technical effect of ultrasonic impact action in accordance with the present invention.

FIG. 21 illustrates the technical effect of the distribution of secondary stresses throughout the depth of a material with and without the application of ultrasound. Specifically, a material has a greater amount of secondary stresses, i.e., residual stresses formed within microscopic regions, when ultrasound is applied to the material than without the application of ultrasound. FIG. 22 illustrates the technical effect of normalization of the mesostructure, recrystallization, and normalization of grain size of a material with the application of ultrasound in accordance with the method of the present invention. FIG. 23 illustrates the technical effect of normalization of microhardness distribution in a material with and without the application of ultrasound. Specifically, a material has a greater microhardness throughout its depth when the material is treated with ultrasound than without the treatment of ultrasound.

The term "white layer" as used herein means such a condition of the material that when etched for metallographic structure identification, the material does not etch, i.e., cannot be etched, and thus, shows up as a white layer in the microphotograph. In other words, this condition of the material does not have typical structure for metals and based on its specific features may be called amorphous. The metal in the white layer area is characterized by unique service performance such, but not limited to, yield and ultimate strengths greater than those of untreated material; great resistance to friction, contact dynamic and static loads; and great resistance to general corrosion, stress corrosion and corrosion fatigue.

Figure 24:
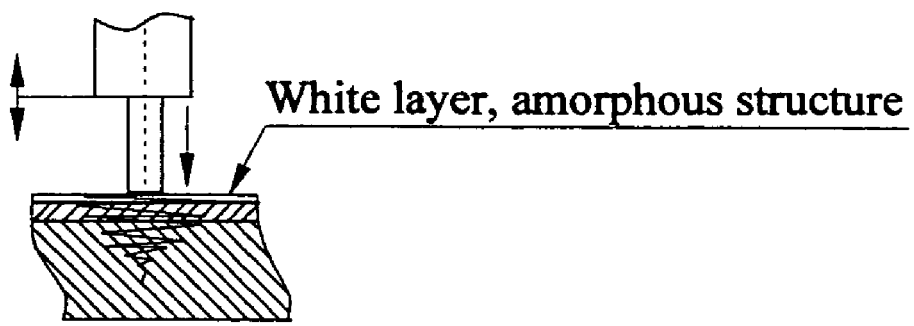
FIG. 24 is a schematic representation of a white layer and amorphous structure of a material, which is a possible technical effect of ultrasonic impact action in accordance with the present invention.

A combined and simultaneous effect of the following upon a material in the localized area of the impulse action, including for example during ultrasonic impact, is mainly responsible for white layer formation in many metal alloys during impulse action: high temperature at the localized area of treatment (at the level of phase transformations) due to multiple impulses in one "spot"; quick heat dissipation from the localized "spot" of the impulse action on the metal being treated; and the large formation rate of the "spot" plastic deformation with a high level of operating mechanical stresses in the impulse action area and during ultrasonic impact, the large formation rate of the "spot" ultrasonic plastic deformation area with a high level of mechanical stresses due to ultrasonic impact dynamics. FIG. 24 illustrates the technical effect of structure amorphization and white layer formation of a material treated with ultrasound in accordance with the method of the present invention. The white layer is the layer where the change or transformation of the material occurs during the application of ultrasound.

Figure 25:
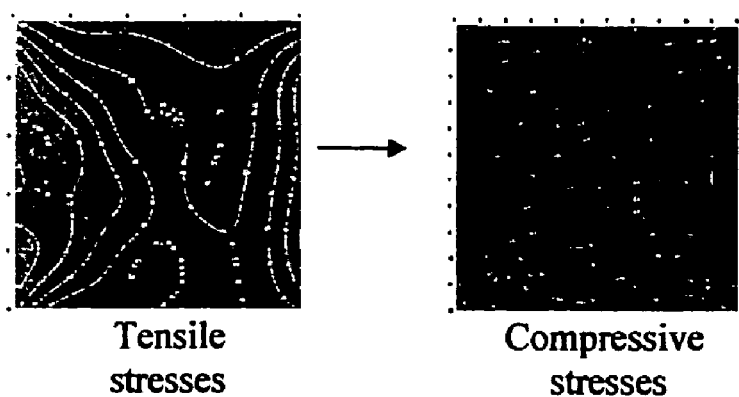
FIG. 25 illustrates the stress relaxation between tensile stress and compressive stresses, which is a possible technical effect of ultrasonic impact action in accordance with the present invention.
Figure 26:
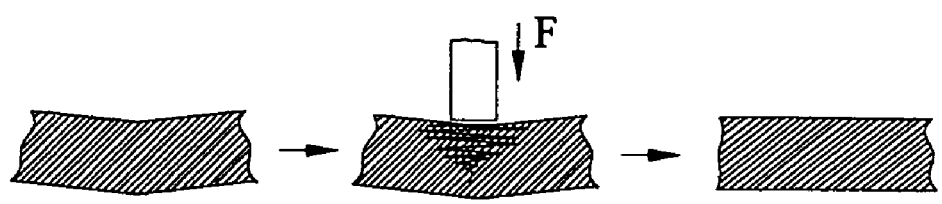
FIG. 26 is a schematic representation of the compensation, directed distribution and redistribution of deformations, which is a possible technical effect of ultrasonic impact action in accordance with the present invention.
Figure 27:
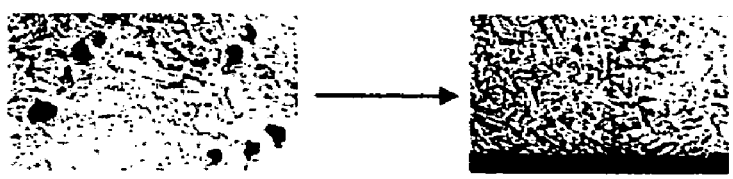
FIG. 27 illustrates the elimination of structural defects, which is a possible technical effect of ultrasonic impact action in accordance with the present invention.

FIG. 25 illustrates the technical effect of stress relaxation during ultrasonic treatment, wherein hazardous residual tensile stresses, caused by metal shrinkage on cooling, are replaced with favorable compressive stresses. FIG. 26 illustrates the technical effect of compensation, directed distribution and redistribution of deformations of a material treated with ultrasound in accordance with the method of the present invention. FIG. 27 illustrates the technical effect of the elimination of structural defects due to the application of ultrasound in accordance with the method of the present invention.

The ultrasonic impact method of the present invention may be utilized to achieve various desired technical effects in the treated area of a material. These desired technical effects of the ultrasonic impact that directly affect the treated area of the material, either singly or in aggregate, preferably comprise: providing uniform distribution of effects on the surface and within the volume of the material; increasing material limiting physico-mechanical characteristics described, including by yield point and ultimate strength, relative deformability in certain directions, ductility and resistibility to deformations due to normal and shearing stresses in tension, compression, torsion, bending and shear in planar stressed state and volumetric-stressed state; stabilizing and increasing ductility and impact strength; increasing fatigue resistance and crack resistance; increasing contact stress resistance; increasing thermo-mechanical stress resistance; increasing thermo-mechanical fatigue and aging resistance; increasing stress corrosion failure resistance; increasing corrosion-fatigue failure resistance; increasing quality and homogeneity of the structure of the material, weld metal and casting alloys; replacing hazardous residual tensile stresses, caused by metal shrinkage on cooling, with favorable compressive stresses; increasing ductility of materials whose structure is formed on quenching after heating in the region of transformation temperatures; increasing the stable phase state and stable structure formation rate during heat production processes and processing of materials and joints; reducing the diffusion hydrogen content in a solid solution of the material or joint; providing strain hardening of materials and joints; providing strain (dynamic) alloying of materials; providing diffusion alloying of materials based on the introduction of ultra-fine powders into the ductile matrix; forming high-strength composites; providing thermo-mechanical modification of material properties; increasing life and operational reliability of machinery components, including mechanical strength, fatigue strength and contact strength because of the layer structure formed by the hardened metal on the material surface and more ductile base and on this basis, omitting heat treatment of machinery components; replacing residual tensile stresses on the surface of machinery components finished by machining with favorable compressive stresses; increasing surface quality of machinery components by providing minimum roughness, creating compressive stresses and obtaining very uniform distribution thereof; providing quality and life control of machinery components and friction couples by creating regular and uniformly distributed micro and macro-reliefs on the surfaces; reducing and redistributing hazardous process-induced residual stresses; increasing size and distortion stability of load-carrying products and structures with process-induced residual stresses during fabrication and maintenance; reducing and compensating residual stresses and deformations caused by heat processes and temperature gradients in fabrication, maintenance and repair of components, structures and joints; de-concentrating hazardous stresses by optimizing the transition geometry in the stress concentration area and inducing favorable residual-stresses; increasing adhesion bond strength during coating; increasing strength, viscosity and quality of surface coatings; plating and joining dissimilar materials; and obtaining any of the above results under conditions of manufacture, maintenance, update and repair of new products, materials, structures and joints.

Figure 28:
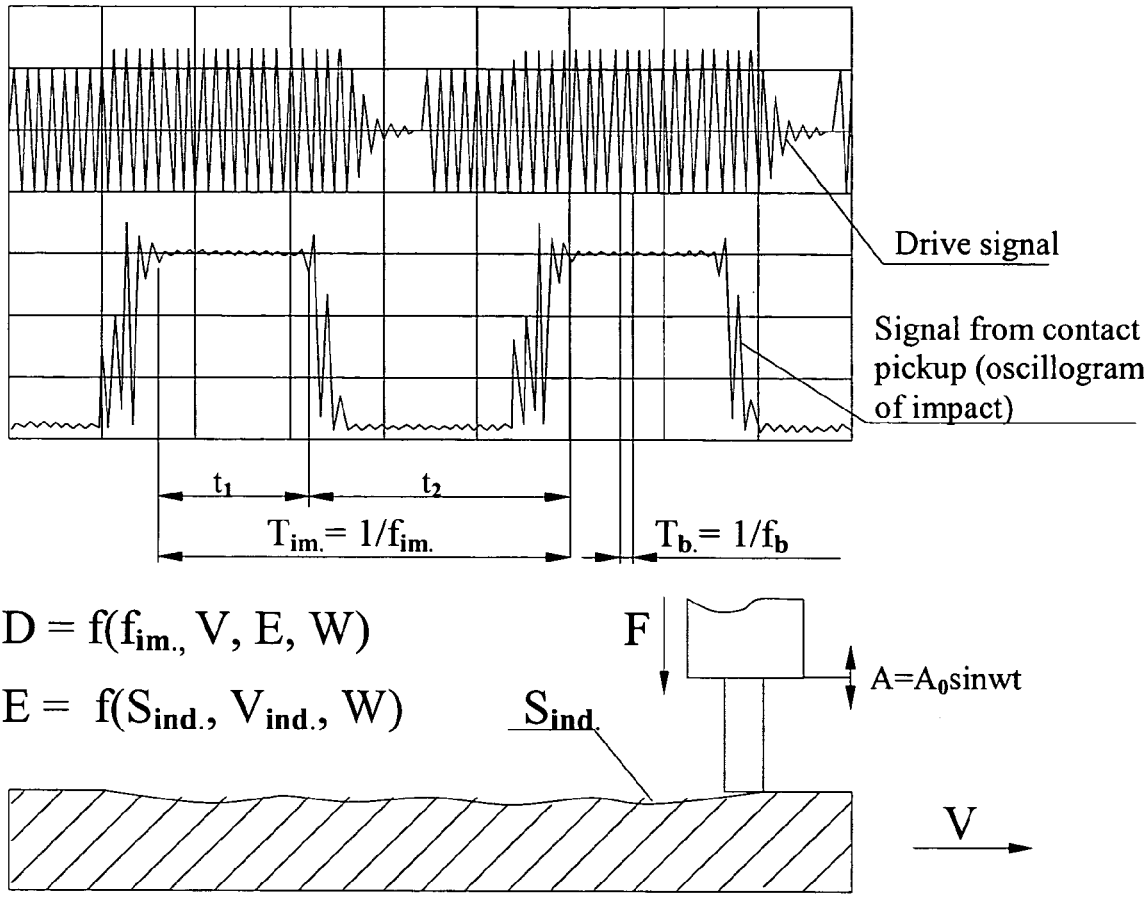
FIG. 28 is a schematic representation of ultrasonic impact parameters in accordance with the present invention.

FIG. 28 is a schematic representation of ultrasonic impact parameters which may be utilized with the method of the present invention. Specifically, the impact density (D) is directly related to the impact frequency ($f_{im}$), the workpiece speed (V), the treatment effectiveness (E) and the impact energy (W). The treatment effectiveness (E) is directly related to the indentation area ($S_{ind.}$), the indentation volume ($V_{ind.}$) and the impact energy (W).

Figure 29:
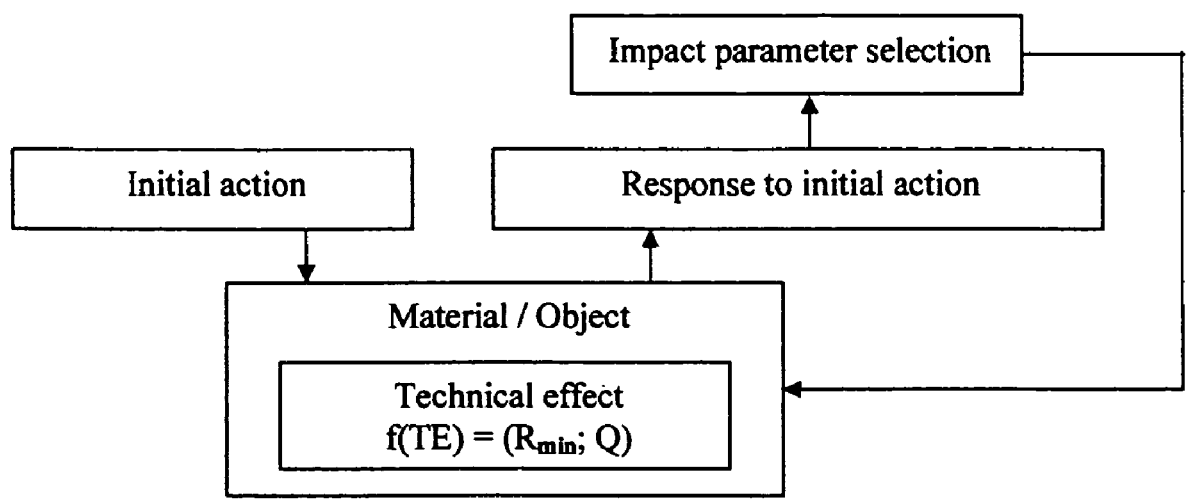
FIG. 29 is a block diagram of an algorithm of action upon an object/material in accordance with the present invention.

The algorithm of action upon a material or object using ultrasonic impacts in accordance with the method of the present invention is shown in a block diagram in FIG. 29. An initial action acts upon a material or object, wherein the material/object responds to the initial action. Based upon this response, impact parameters may then be selected in order for the desired technical effect to be attained by the material/object. This series may be repeated until the desired technical effect is attained by the material/object. The desired technical effect is directly related to the minimum resistance of the material to the action ($R_{min}$) and the resulting material quality (Q).

Figure 30D:
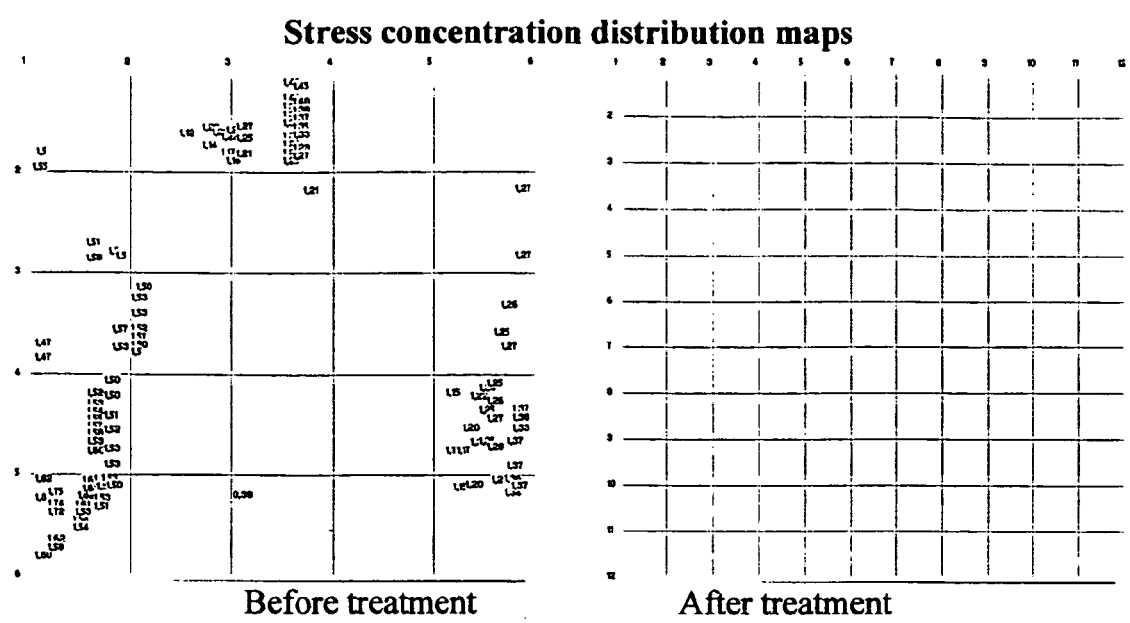

FIGS. 30(a)-30(d) are schematic representations of the technical effect of stress and fatigue behavior improvement due to ultrasonic impact treatment in accordance with the method of the present invention. FIG. 30(a) illustrates S-N curves, i.e., stress-cycle curves with and without ultrasound application. Specifically, the S-N curve is higher for a material treated with ultrasound than a material not treated with ultrasound. FIG. 30(b) illustrates the stress concentration factor as a function of the ultrasonic impact treatment (UIT) groove. Specifically, the stress concentration factor ($K_t$) greatly decreases, but remains above one as the radius (R) increases. FIG. 30(c) illustrates the ultimate stress diagram. The ultimate stress can be defined as $$\text{Tan}(\alpha) = \frac{\sigma_{max}}{\sigma_m} = \frac{2}{(R_\sigma + 1)};$$

wherein $\alpha$ is the ultimate stress, $\sigma_{max}$ is maximum stress, $\sigma_m$ is mean stress and $R_\sigma$ is stress ratio. In FIG. 30(c), curves 1 and 2 define the fatigue limit of a material for various stress ratios, wherein curve 1 is without ultrasonic treatment and curve 2 is after ultrasonic treatment. In comparing curve 1 and curve 2, the endurance limit at symmetric loading cycle after ultrasonic treatment ($\sigma_{-1_2}$) is higher than the endurance limit at symmetric loading cycle without ultrasonic treatment ($\sigma_{-1_1}$). The yield point of ultrasonically treated material ($\sigma_{T2}$) is greater than the yield point of untreated material ($\sigma_{T1}$). Also, the ultimate resistance of ultrasonically treated material ($\sigma_{B2}$) is greater than the ultimate resistance of untreated material ($\sigma_{B1}$). Additionally, $R'_{\sigma 2}$ is the stress ratio corresponding to $\sigma'$ of ultrasonically treated material and $R'_{\sigma 1}$ is the stress ratio corresponding to $\sigma'$ of untreated material. These verify that the region of increasing load-carrying capacity of the ultrasonically treated structure increases proportionally to the ratio between areas described by curve 1 (without ultrasonic treatment) and curve 2 (after ultrasonic treatment).

FIG. 30(d) illustrates stress concentration distribution maps before ultrasonic treatment and after ultrasonic treatment. As shown, stress concentration essentially is eliminated after ultrasonic impact treatment.

Various types of devices and apparatus may be used with the method of the present invention including, but not limited to, welding devices, ultrasonic impact tools, metalworking, metallurgy, casting, rolling, die forging, galvanizing, electron-beam, electro-pulse, thermo-mechanical, magnetic-pulse, vacuum and laser equipment. Any suitable device or apparatus may be used in conjunction with the method of the present invention.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

The invention claimed is:

1. A method of modifying or producing at least one predetermined property in a material by impulse treatment to attain at least one technical effect in the material comprising:
   (a) providing a controlled action of impulse energy upon an area of a material, wherein said action comprises normalized impulses and pauses;
   (b) monitoring response in said material to said action;
   (c) modulating amplitude, frequency and/or pulse-width of said action based upon said response in said material to said action in order to synchronize and adapt an individual impulse and individual pause of said action with said response in said material so that said material has minimum resistance to said action, wherein said minimum resistance is identified by a saturation of Q-factor in said area treated by said action; and
   (d) repeating (a) through (c) until said at least one technical effect is attained in said material.

2. The method according to claim 1, wherein said impulses comprise periods of material condition impulse activation and said pauses comprise periods of relaxation, wherein a regular pulse of said action of impulse energy provides an impact to said material during said period of material condition impulse activation, and wherein a series of normalized impulse actions attains said at least one technical effect.

3. The method according to claim 1, wherein said impulses are applied to said material until said material reaches said minimum resistance to said impulses whereupon said pauses begin, and wherein said impulses and said pauses are in synchronism with said response in said material with said minimum resistance determined by said saturation of the Q-factor in said treated area.

4. The method according to claim 1 or 2, wherein said method is utilized with a process of arc welding, heat welding, resistance welding, friction welding, friction stir welding, ultrasonic welding, diffusion welding, pressure welding, electron-beam welding, laser welding, heat treatment, thermal-mechanical treatment, electric-spark treatment, ultrasonic treatment, ultrasonic impact treatment, galvanization, coating applications, surface finishing, soldering, making of adhesive joints between metals and non-metals, adhesive metal coating applications, electric-arc production of cast alloys and castings, or formation of metals and alloys.

5. The method according to claim 4, wherein waveform and parameters of said action of impulse energy of said impulses are within a frequency range of mechano-acoustic and electromagnetic spectra.

6. The method according to claim 5, wherein said action of impulse energy includes a carrier energy signal and said waveform of said carrier energy signal is changed within a stress ratio range from negative one (−1) to greater than zero such that said waveform of said energy signal is maintained and based upon conformity to said at least one technical effect in accordance with said saturation of the Q-factor in said area of said material treated with said impulses with a minimum resistance thereto.

7. The method according to claim 1 or 2, wherein said action of impulse energy is normalized by adjusting amplitude and length of an individual impulse of said action.

8. The method according to claim 1 or 2, wherein time length of an individual pause of said pauses changes in said material prior to attaining said at least one technical effect and wherein a time required for relaxing changes in said material from said impulse is a criterion of said time length of said pause.

9. The method according to claim 1, wherein said minimum resistance to an individual impulse of said impulses on said material is a criterion of a single impulse energy normalization while said at least one technical effect is attained in said material.

10. The method according to claim 1, wherein a complete level of energy of said action upon said material which is required to attain said at least one technical effect in said material is a criterion of normalizing said impulses and pauses and a criterion of determining a repetition rate of said action of impulse and said minimum resistance is determined by an asymptotic loss decrease and a respective proportional damping of said response of said material to said impulses during said pauses.

11. The method according to claim 1, wherein said response of said material to said action of impulse is determined in part on a current of controlled energy, wherein a signal of said current is used to control parameters of an energy signal of said controlled energy and to modulate said energy signal during said action.

12. The method according to claim 1, wherein energy and length of an individual impulse of said impulses and an individual pause of said pauses is adjusted within a range of from random to being controlled by a change in amplitude, a ratio between a length of said impulse and a length of said pause, and repetition rate.

13. The method according to claim 1, wherein said action of impulse energy includes an energy signal which comprises heat, electromagnetic, beam, coherent, quasi-static, acoustic, thermo-dynamic, or energy of ultrasound, and said action of said impulses and pauses can be included in said energy signal or be parallel therewith.

14. The method according to claim 1, wherein synchronizing of said action with said response in said material is based upon signals obtained from listening to said material during a directed property change occurring in said material, monitoring change dynamics and said saturation of Q-factor in said area treated in said material, and/or recording of a macro-response of said material to said action.

15. The method according to claim 14, wherein said signals represent behavior of said material which are read by a tuned controlling process device as said material is affected.

16. The method according to claim 1, wherein synchronizing of said action of impulse with said response of said material to said action is by one of (1) directly measuring acoustic signals of structural noise of said material; (2) measuring the Q-factor during said pauses; or (3) recording fundamental oscillation damping of said material during an individual pause of said pauses in synchronism and/or in phase with said response of said material to said action.

17. The method according to claim 1, wherein a controlled carrier of said action of impulse energy is ultrasonic impact, and wherein said at least one technical effect is attained by controlling a plurality of ultrasonic impact parameters, in-process control of said response of said material to an ultrasonic impact within a control range of a control probability factor for said parameters within a range of 0 to 1 and inversely.

18. The method according to claim 1, wherein a controlled carrier of said action of impulse energy is ultrasonic impact, and wherein conditions for creating said at least one technical effect includes induced and/or residual deformations and stresses, impulse, alternating and repeating stresses, plastic deformation, recrystallization, relaxation or diffusion provided by ultrasonic impact, and wherein said at least one technical effect is attained by controlling a plurality of ultrasonic impact parameters, in-process control of said response of said material to an ultrasonic impact being within a control range of a control probability factor for said parameters within a range of 0 to 1 and inversely.

19. The method according to claim 17 or 18, wherein physical effects of said ultrasonic impact upon said material determine, either singly or in aggregate, at least one condition of attaining said at least one technical effect, said at least one condition including at least one of creating optimal conditions for ultrasonic transmission into said material, reduction in diffusion resistance, reduction in mosaic block size of said material, reduction in deformation resistance during ultrasonic impact, activation of vacancies, dislocations and shear planes, normalization of depths and distributions of plastic deformations and resultant stresses in said material, distribution of secondary stresses, normalization of mesostructure of said material and protection of the mesostructure against dynamic failures due to impact, normalization of microhardness and distribution of microhardness through depth of said material, recrystallization of said material, degassing, and increase in resistance to structural and liquation defect formation, normalization of crystallization conditions and grain sizes in cast alloys and welded joints, structural amorphization of said material, stress relaxation, compensation and directed distribution and redistribution of deformations, elimination of structural defects, and production of a white layer.

20. The method according to claim 17 or 18, wherein said at least one technical effect of said ultrasonic impact is at least one of providing uniform distribution of effects on a surface and within a volume of said material, increasing material limiting physico-mechanical characteristics described at least by yield point and ultimate strength, relative deformability in certain directions, ductility and resistibility to deformations due to normal and shearing stresses in tension, compression, torsion, bending and shear in a planar stressed state and a volumetric-stressed state, stabilizing and increasing ductility and impact strength, increasing fatigue resistance and crack resistance, increasing contact stress resistance, increasing thermo-mechanical stress resistance, increasing thermo-mechanical fatigue and aging resistance, increasing stress corrosion failure resistance, increasing corrosion-fatigue failure resistance, increasing quality and homogeneity of a structure of a weld metal and casting alloys, replacing hazardous residual tensile stresses, caused by metal shrinkage on cooling, with favorable compressive stresses, increasing ductility of a material whose structure is formed on quenching after heating in a region of transformation temperatures, increasing a stable phase state and stable structure formation rate during heat production processes and processing of materials and joints, reducing diffusion hydrogen content in a solid solution of said material, providing strain hardening of said material, providing strain alloying of said material, providing diffusion alloying of said material based on introduction of ultrafine powders into a ductile matrix, forming high-strength composites, providing thermo-mechanical modification of material properties, increasing life and operational reliability of machinery components, including mechanical strength, fatigue strength and contact strength because of a layer structure formed of hardened metal on a material surface and a more ductile base, eliminating heat treatment of machinery components, replacing residual tensile stresses on a surface of machinery components finished by machining with favorable compressive stresses, increasing surface quality of machinery components by providing minimum roughness, creating compressive stresses and attaining uniform distribution thereof, providing quality and life control of machinery components and friction couples by creating regular and uniformly distributed micro-reliefs and macro-reliefs on a surface of said components, reducing and redistributing hazardous process-induced residual stresses, increasing size and distortion stability of load-carrying products and structures with process-induced residual stresses during fabrication and maintenance, reducing and compensating residual stresses and deformations caused by heat processes and temperature gradients in fabrication, maintenance and repair of components, structures and joints, deconcentrating hazardous stresses by optimizing transition geometry in a stress concentration area and inducing favorable residual stresses, increasing adhesion bond strength during coating, increasing strength, viscosity and quality of surface coatings, plating and joining dissimilar materials, and any combination thereof.

21. The method according to claim 20, wherein said at least one technical effect of said ultrasonic impact is obtained under conditions of manufacture, maintenance, update or repair of materials, products, structures or joints.

22. The method according to claim 17 or 18, wherein a set of controlled parameters of said ultrasonic impact, which is in synchronism and/or in phase with said response in said material to said ultrasonic impact, is based on a criterion of minimum resistance to said ultrasonic impact on said material upon attaining said at least one technical effect which is identified by said saturation of the Q-factor in the area treated in said material, wherein said set of controlled parameters include one or more of the following parameters: ultrasonic impact length wherein said length is a cumulative time when an indenter simultaneously contacts said material and an ultrasonic transducer tip, as well as ultrasonic oscillations of an indenter in a gap between said material and said ultrasonic transducer tip, pause duration between ultrasonic impacts, repetition rate or off-duty factor of impacts at a given impact length or pause between impacts, impact density related to a unit area of a treated surface or a unit time of treatment by ultrasonic impacts, impact efficiency which comprises an area or volume of a single indentation or a volume of material with plastic deformations induced into said material, amplitude and frequency of carrier ultrasonic oscillations, amplitude of impact rebound caused by carrier oscillations of ultrasonic frequency, static pressure exerted on a surface of said material and accompanying a process of ultrasonic impact initiation, a coupling level in a system source of ultrasonic mechanical oscillations, an equivalent mass, natural frequency and equivalent elasticity of said equivalent mass in a point of impact, and an acoustic elasticity, mass and configuration of an impacting element.

23. The method according to claim 17 or 18, wherein said in-process control comprises a sequence of: pre-determining experimental reference data by measuring ultrasonic oscillating amplitude, impact frequency and length, current parameters under loaded conditions during ultrasonic impact excitation, current parameters and damping factor of fundamental oscillation of a UIM system, which includes an ultrasonic resonant body, impact elements and treated material, in pause between ultrasonic impacts that characterize said response of said material to said impulse action and any change in quality of said material upon attaining said at least one technical effect; measuring oscillating parameters of UIM, including oscillating amplitude, impact frequency and length, current parameters under load during ultrasonic impact excitation, current and damping factor of fundamental oscillations of UIM in pause between ultrasonic impacts that characterize said response of said material to said action and any change in quality of said material during an actual operating process with application of ultrasonic impact to obtain actual current data; comparing said oscillating parameters of UIM with said experimental reference data; calculating an agreement between said experimental reference data and said actual current data obtained by comparing said reference data and said actual current data and correcting said agreement based upon said at least one technical effect; converting said agreement data into control code; generating a control algorithm and control signals from said response of said material to said action and dynamics of the saturation of the Q-factor in the treated area of said material; and automatically controlling ultrasonic impact parameters in UIM, which are adequate for attaining said at least one technical effect.

24. The method according to claim 23, wherein said ultrasonic impacts act in synchronism and/or in phase with said response of said material to an effect of said ultrasonic impacts, wherein ultrasonic impact parameters are chosen in accordance with the sequence of claim 23 and are subjected to said minimum resistance of said action of impulse energy which suffices to attain said at least one technical effect within a volume of said material and said minimum resistance is identified based upon said saturation of the Q-factor in the area treated in said material.

25. The method according to claim 17 or 18, wherein ultrasound is transmitted into said material through an area of ultrasonic plastic deformation caused by said ultrasonic impact, wherein said area of ultrasonic plastic deformation is formed by a series of controlled impulse actions upon said material until said saturation of the Q-factor is attained in said area.

26. The method according to claim 23, wherein a uniform distribution of material characteristics sufficient to attain said at least one technical effect on a surface and within a volume of the area treated in said material is a criterion of a treatment result, while said material characteristics are obtained with active in-process control of said sequence in accordance with claim 23.

27. The method according to claim 17 or 18, wherein said impulse treatment is volumetric impulse treatment, wherein said volumetric impulse treatment of said material is performed with an ultrasonic impacting tool fixed relative to said material, wherein said ultrasonic impacting tool initiates said action of impulse energy at fundamental oscillating frequencies of said material which are generated by said impulses with said pauses therebetween and active in-process control, while said material is exposed or not exposed to a distributed static pressure, distributed dynamic loading, distributed heating, in a vacuum or inert gas, in a chamber with specific environment, in a process bath, or in open air.

28. The method according to claim 17 or 18, wherein physical effects of ultrasonic impact upon said material determine at least one condition of attaining said at least one technical effect and include structural defect elimination, including at least one of sub-surface pores, microcracks, large grains, dendrites, diffusion hydrogen, hidden structural stress concentrations, mesostructure defects, and laminations, wherein said structural defects are eliminated by local or volumetric effect on said material, while said defect elimination is caused by diffusion activation, plastic deformation, recrystallization, relaxation and/or optimization of hazardous vacancy and dislocation condition in said material, and wherein said effect is governed by a combination or independent effect of said action of impulse energy upon a surface or within a volume of said material by ultrasonic impacting, ultrasonic impact waves and oscillations on said material, elastic or plastic deformations, while said material is exposed or not exposed to a distributed static pressure, distributed dynamic loading, distributed heating, in a vacuum or inert gas, in a chamber with specific environment, in a process bath, or in open air.

29. The method according to claim 17 or 18, wherein stress concentrations, areas with low fatigue resistance and low crack formation resistance, are decreased or eliminated by said ultrasonic impact and resultant plastic deformation of said material, geometric stress deconcentration, creation of a field of favorable residual compressive stresses, replacing hazardous tensile stresses with favorable compressive stresses, relaxation of unfavorable residual tensile stresses, elimination of sub-surface defects, material structure modification, increase in material ductility under conditions of quasistatic, dynamic, cyclic and alternate loading, improving thereby fatigue resistance, corrosion-fatigue resistance and/or stress corrosion resistance of said material.

30. The method according to claim 17 or 18, wherein said control probability factor is a dimensionless function expressed by a ratio between a number of repetitions of ultrasonic impact parameters and number of ultrasonic impacts, which is sufficient and necessary so as to attain said at least one technical effect in said area treated by said action of impulse energy.

31. The method according to claim 17 or 18, wherein said impulse action of impulse energy machines metals and alloys, wherein stress fluctuation in a deformation center is first measured, a tuned acoustic vibrating system is built, a response of said system to a tool-workpiece load is measured, ultrasonic impulses in synchronism and/or in phase with response parameters are generated, and in-process control is activated.

32. The method according to claim 17 or 18, wherein said material is heat treated using an ultrasonic impact tool as a detecting means of said response of said material being heat treated to the action, and as a source of normalized ultrasonic impulses and pauses in between that suffice to activate diffusion and structural changes in said material based on an algorithm of said in-process control.

33. The method according to claim 1, wherein said energy is arc welding, wherein said arc welding is conducted using a current of ultrasonic frequency which is modulated by normalized impulses having amplitude, length and repetition rate set based on related criteria of heat input minimization, specified quality of a weld metal and near-weld zone, residual stress and deformation minimization and providing specified process efficiency.

34. The method according to claim 1, wherein said energy is arc welding, wherein said arc welding is conducted using welding electrodes or filler material with ultrasonic frequency which is modulated by normalized impulses having amplitude, length and repetition rate set based on related criteria of heat input minimization, specified quality of a weld metal and nearweld zone, residual stress and deformation minimization and providing specified process efficiency.

35. A product produced according to the method of claim 1.

36. A product produced according to the method of claim 19.

37. A method of modifying or producing at least one predetermined property in a material by impulse treatment to attain at least one technical effect in the material comprising:
(a) providing a controlled impulse action upon an area of a material, wherein said impulse action is an ultrasonic impulse action comprising normalized impulses and pauses;
(b) monitoring response in said material to said ultrasonic impulse action;
(c) modulating amplitude, frequency and/or pulse-width of said ultrasonic impulse action based upon said response of said material to said ultrasonic impulse action in order to synchronize and adapt an individual impact and individual pause of said ultrasonic impulse action with said response in said material so that said material has minimum resistance to said ultrasonic impulse action, wherein said minimum resistance is identified by a saturation of Q-factor in said area treated by said ultrasonic impulse action, and
(d) repeating (a) through (c) until said at least one technical effect is attained in said material.

38. The method according to claim 37, wherein said impulses comprise periods of material condition impulse activation and said pauses comprise periods of relaxation, wherein a regular pulse of said ultrasonic impulse action provides an impact to said material during said period of material condition impulse activation, and wherein a series of normalized ultrasonic impulse actions attains said at least one technical effect.

39. The method according to claim 37 or 38, wherein energy of said ultrasonic impulse action of a controlled ultrasonic impact is normalized by adjusting amplitude, and length of an individual impulse of said ultrasonic impulse action.

40. The method according to claim 38, wherein time length of an individual pause of said pauses changes in said material prior to attaining said at least one technical effect and wherein a time required for relaxing changes in said material from said impulse is a criterion of said time length of said pause.

41. The method according to claim 37, wherein said impulses are applied to said material until said material reaches said minimum resistance to said impulses whereupon said pauses begin, and wherein said impulses and said pauses are in synchronism with said response in said material with said minimum resistance determined by said saturation of the Q-factor in said treated area.

42. The method according to claim 37, wherein said minimum resistance to an individual impulse of said impulses on said material is a criterion of a single impulse energy normalization while said at least one technical effect is attained in said material.

43. The method according to claim 37, wherein a complete level of energy of said ultrasonic impulse action upon said material which is required to attain said at least one technical effect in said material is a criterion of normalizing said ultrasonic impulses and pauses and a criterion of determining a repetition rate of said ultrasonic impulse action and said minimum resistance is determined by an asymptotic loss decrease and a respective proportional damping of said response of said material to said ultrasonic impulses during said pauses.

44. The method according to claim 37, wherein said response of said material to said ultrasonic impulse action is determined in part on a current of said controlled source of ultrasonic impact energy, wherein a signal of said current is used to control parameters of an energy signal of said controlled source of ultrasonic impact energy and to modulate said energy signal during said impulse action.

45. The method according to claim 37, wherein energy and length of an individual impulse of said impulses and an individual pause of said pauses is adjusted within a range of from random stochastic to being controlled by a change in amplitude, a ratio between a length of said impulse and a length of said pause, and repetition rate.

46. The method according to claim 37, wherein said at least one technical effect is attained by controlling multiple ultrasonic impact parameters, in-process control of said response of said material to an impulse of said ultrasonic impulse action being within a control range of a control probability factor for said parameters within a range of 0 to 1 and inversely.

47. The method according to claim 37, wherein conditions for creating said at least one technical effect includes induced and/or residual deformations and stresses, impulse, alternating and repeating stresses, plastic deformation, recrystallization, relaxation or diffusion provided by ultrasonic impact, and wherein said at least one technical effect is attained by controlling multiple ultrasonic impact parameters, in-process control of said response of said material to an ultrasonic impact being within a control range of a control probability factor for said parameters within a range of 0 to 1 and inversely.

48. The method according to claim 37, wherein said at least one technical effect of energy of ultrasonic impact upon said material determines, either singly or in aggregate, at least one condition of attaining said at least one technical effect, said at least one condition including at least one of creating optimal conditions for ultrasonic transmission into said material, reduction in diffusion resistance, reduction in mosaic block size of said material, reduction in deformation resistance during ultrasonic impact, activation of vacancies, dislocations and shear planes, normalization of depths and distributions of plastic deformations and resultant stresses in said material, distribution of secondary stresses, normalization of mesostructure of said material and protection of the mesostructure against dynamic failures due to impact, normalization of microhardness and distribution of microhardness through depth of said material, recrystallization of said material, degassing, and increase in resistance to structural and liquation defect formation, normalization of crystallization conditions and grain sizes in cast alloys and welded joints, structural amorphization of said material, stress relaxation, compensation and directed distribution and redistribution of deformations, elimination of structural defects, and production of a white layer.

49. The method according to claim 37, wherein said at least one technical effect of said ultrasonic impulse action is at least one of providing uniform distribution of effects on a surface and within a volume of said material, increasing material limiting physico-mechanical characteristics described at least by yield point and ultimate strength, relative deformability in certain directions, ductility and resistibility to deformations due to normal and shearing stresses in tension, compression, torsion, bending and shear in a planar stressed state and a volumetric-stressed state, stabilizing and increasing ductility and impact strength, increasing fatigue resistance and crack resistance, increasing contact stress resistance, increasing thermo-mechanical stress resistance, increasing thermo-mechanical fatigue and aging resistance, increasing stress corrosion failure resistance, increasing corrosion-fatigue failure resistance, increasing quality and homogeneity of a structure of a weld metal and casting alloys, replacing hazardous residual tensile stresses, caused by metal shrinkage on cooling, with favorable compressive stresses, increasing ductility of a material whose structure is formed on quenching after heating in a region of transformation temperatures, increasing a stable phase state and stable structure formation rate during heat production processes and processing of materials and joints, reducing diffusion hydrogen content in a solid solution of said material, providing strain hardening of said material, providing strain alloying of said material, providing diffusion alloying of said material based on introduction of ultrafine powders into a ductile matrix, forming high-strength composites, providing thermo-mechanical modification of material properties, increasing life and operational reliability of machinery components, including mechanical strength, fatigue strength and contact strength because of a layer structure formed by a hardened metal on a material surface and a more ductile base, eliminating heat treatment of machinery components, replacing residual tensile stresses on a surface of machinery components finished by machining with favorable compressive stresses, increasing surface quality of machinery components by providing minimum roughness, creating compressive stresses and attaining uniform distribution thereof, providing quality and life control of machinery components and friction couples by creating regular and uniformly distributed micro-reliefs and macro-reliefs on a surface of said components, reducing and redistributing hazardous process-induced residual stresses, increasing size and distortion stability of load-carrying products and structures with process-induced residual stresses during fabrication and maintenance, reducing and compensating residual stresses and deformations caused by heat processes and temperature gradients in fabrication, maintenance and repair of components, structures and joints, deconcentrating hazardous stresses by optimizing transition geometry in a stress concentration area and inducing favorable residual stresses, increasing adhesion bond strength during coating, increasing strength, viscosity and quality of surface coatings, plating and joining dissimilar materials, and any combination thereof

50. The method according to claim 49, wherein said at least one technical effect of said ultrasonic impulse action is obtained under conditions of maintenance, update or repair of materials, products, structures or joints.

51. The method according to claim 37, wherein a set of controlled parameters of energy of ultrasonic impact, which is in synchronism and/or in phase with said response in said material to said energy of ultrasonic impact, is based on a criterion of minimum resistance to said ultrasonic impact on said material upon attaining said at least one technical effect which is identified by said saturation of the Q-factor in the area treated in said material, wherein said set of controlled parameters include one or more of the following parameters: ultrasonic impact length wherein said length is a cumulative time when an indenter simultaneously contacts said material and an ultrasonic transducer tip, as well as ultrasonic oscillations of an indenter in a gap between said material and said ultrasonic transducer tip, pause duration between ultrasonic impacts, repetition rate or off-duty factor of impacts at a given impact length or pause between impacts, impact density related to a unit area of a treated surface or a unit time of treatment by ultrasonic impacts, impact efficiency which comprises an area or volume of a single indentation or a volume of material with plastic deformations induced into said material, amplitude and frequency of carrier ultrasonic oscillations, amplitude of impact rebound caused by carrier oscillations of ultrasonic frequency, static pressure exerted on a surface of said material and accompanying a process of ultrasonic impact initiation, a coupling level in a system source of ultrasonic mechanical oscillations, an equivalent mass, natural frequency and equivalent elasticity of said equivalent mass in a point of impact, and an acoustic elasticity, mass and configuration of an impacting element.

52. The method according to claim 37, wherein said in-process control comprises a sequence of: pre-determining experimental reference data by measuring ultrasonic oscillating amplitude, impact frequency and length, current parameters under loaded conditions during ultrasonic impact excitation, current parameters and damping factor of oscillating system, which includes an ultrasonic resonant body, impact elements and treated material (UIM), in pause between ultrasonic impacts that characterize said response of said material to said ultrasonic impulse action and any change in quality of said material upon attaining said at least one technical effect; measuring oscillation parameters of UIM system, including oscillating amplitude, impact frequency and length, current parameters under load during ultrasonic impact excitation, current and damping factor of oscillation of said UIM system in pause between ultrasonic impacts that characterize said response of said material to said impulse action and any change in quality of said material during actual operating process with application of ultrasonic impact energy to obtain actual current data; comparing said oscillation parameters of UIM system with said experimental reference data; calculating an agreement between said experimental reference data and said actual current data obtained by comparing said reference data and said actual current data and correcting said agreement based upon said at least one technical effect; converting said agreement data into control code; generating a control algorithm and control signals from said response of said material to said impulse action and dynamics of the saturation of the Q-factor in the treated area of said material; and automatically controlling ultrasonic impact parameters in UIM, which are adequate for attaining said at least one technical effect.

53. The method according to claim 52, wherein said ultrasonic impacts act in synchronism andlor in phase with said response of said material to an effect of said ultrasonic impacts, wherein said ultrasonic impact parameters are chosen in accordance with the sequence of claim 52 and are subjected to said minimum resistance of said ultrasonic impulse action which suffices to attain said at least one technical effect within a volume of said material and said minimum resistance is identified based on said saturation of the Q-factor in said treated area in said material.

54. The method according to claim 52, wherein a uniform distribution of material characteristics sufficient to attain said at least one technical effect on a surface and within a volume of the area treated in said material is a criterion of a treatment result, while said material characteristics are obtained with active in-process control of said sequence in accordance with claim 52.

55. The method according to claim 37, wherein ultrasound is transmitted into said material through an area of ultrasonic plastic deformation caused by ultrasonic impact, wherein said area of ultrasonic plastic deformation is formed by a series of controlled ultrasonic impulse actions upon said material until said saturation of the Q-factor is attained in said area.

56. The method according to claim 37, wherein synchronizing of said ultrasonic impulse action with said response of said material is based upon signals obtained from listening to said material during a directed property change occurring in said material, monitoring change dynamics and said saturation of the Q-factor in said area treated in said material, and/or recording of a macro-response of said material to said ultrasonic impulse action.

57. The method according to claim 56, wherein said signals represent behavior of said material which are read by a tuned controlling process device as said material is affected.

58. The method according to claim 37, wherein synchronizing of said ultrasonic impulse action with said response of said material to said ultrasonic impulse action is by one of (1) directly measuring acoustic signals of structural noise of said material; (2) measuring the Q-factor during said pauses; or (3) recording oscillation damping of said UIM system during an individual pause of said pauses in synchronism and/or in phase with said response of said material to said ultrasonic impulse action.

59. A product produced according to the method of claim 37.

60. A product comprising at least one metal component modified by an impulse treatment of said metal component according to the method of claim 1 and having at least one resultant technical effect from said impulse treatment, said resultant technical effect being at least one of providing uniform distribution of effects on a surface and within a volume of said component, increasing material limiting physico-mechanical characteristics described at least by yield point and ultimate strength, relative deformability in certain directions, ductility and resistibility to deformations due to normal and shearing stresses in tension, compression, torsion, bending and shear in a planar stressed state and a volumetric-stressed state, stabilizing and increasing ductility and impact strength, increasing fatigue resistance and crack resistance, increasing contact stress resistance, increasing thermo-mechanical stress resistance, increasing thermo-mechanical fatigue and aging resistance, increasing stress corrosion failure resistance, increasing corrosion-fatigue failure resistance, increasing quality and homogeneity of said component when said component is a weld metal and casting alloy, replacing hazardous residual tensile stresses, caused by metal shrinkage on cooling, with favorable compressive stresses, increasing ductility of the component when structure thereof is formed on quenching after heating in a region of transformation temperatures, increasing a stable phase state and stable structure formation rate during heat production processes of said component, reducing diffusion hydrogen content in a solid solution of said component, providing strain hardening of said component, providing strain alloying of said component, providing diffusion alloying of said component based on introduction of ultrafine powders into a ductile matrix, forming high-strength composites, providing thermo-mechanical modification of properties of said component, increasing life and operational reliability of machinery components including said component, including mechanical strength, fatigue strength and contact strength because of a layer structure formed of hardened metal on a material surface and a more ductile base, eliminating heat treatment of machinery components, replacing residual tensile stresses on a surface of machinery components including said component and finished by machining with favorable compressive stresses, increasing surface quality of machinery components including said component by providing minimum roughness, creating compressive stresses and attaining uniform distribution thereof, providing quality and life control of machinery components including said component and friction couples by creating regular and uniformly distributed micro-reliefs and macro-reliefs on a surface of said components, reducing and redistributing hazardous process-induced residual stresses, increasing size and distortion stability of load-carrying products and structures including said component with process-induced residual stresses during fabrication and maintenance, reducing and compensating residual stresses and deformations caused by heat processes and temperature gradients in fabrication, maintenance and repair of components, structures and joints including said component, deconcentrating hazardous stresses by optimizing transition geometry in a stress concentration area and inducing favorable residual stresses, increasing adhesion bond strength during coating, increasing strength, viscosity and quality of surface coatings, plating and joining dissimilar materials, and any combination thereof.

61. The product according to claim 60 wherein said impulse treatment is an ultrasonic impulse treatment.

* * * * *